(12) United States Patent
Wieland et al.

(10) Patent No.: US 8,374,724 B2
(45) Date of Patent: Feb. 12, 2013

(54) COMPUTING ENVIRONMENT THAT PRODUCES REALISTIC MOTIONS FOR AN ANIMATRONIC FIGURE

(75) Inventors: Alexis P. Wieland, Los Angeles, CA (US); Akhil Jiten Madhani, Glendale, CA (US); Holger Irmler, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 2936 days.

(21) Appl. No.: 10/917,044

(22) Filed: Aug. 12, 2004

(65) Prior Publication Data

US 2005/0153624 A1 Jul. 14, 2005

Related U.S. Application Data

(63) Continuation-in-part of application No. 10/757,797, filed on Jan. 14, 2004, now Pat. No. 7,238,079.

(51) Int. Cl.
*G05B 19/00* (2006.01)
*G05B 15/00* (2006.01)

(52) U.S. Cl. ............... 700/264; 700/1; 700/245

(58) Field of Classification Search .......... 446/91; 318/568.12; 463/1, 42; 700/1, 245, 264; 701/23

See application file for complete search history.

(56) References Cited

U.S. PATENT DOCUMENTS

| | | | |
|---|---|---|---|
| 4,202,423 A | 5/1980 | Soto | |
| 4,503,924 A | 3/1985 | Bartholet et al. | |
| 4,511,011 A | 4/1985 | Bartholet | |
| 4,527,650 A | 7/1985 | Bartholet | |
| 4,558,758 A | 12/1985 | Littman et al. | |
| 4,565,487 A | 1/1986 | Kroczynski | |
| 4,677,568 A | 6/1987 | Arbter | |
| 4,695,977 A | 9/1987 | Hansen et al. | |
| 4,712,184 A | 12/1987 | Haugerud | |
| 4,747,127 A | 5/1988 | Hansen et al. | |
| 4,774,445 A | 9/1988 | Penkar | |
| 4,815,011 A | 3/1989 | Mizuno et al. | |
| 4,821,463 A * | 4/1989 | Fuller, Jr. | 451/335 |
| 4,833,624 A | 5/1989 | Kuwahara et al. | |
| 4,835,730 A | 5/1989 | Shimano et al. | |

(Continued)

FOREIGN PATENT DOCUMENTS

| | | |
|---|---|---|
| JP | 8174378 A | 7/1996 |
| JP | 10137439 A | 5/1998 |

(Continued)

OTHER PUBLICATIONS

Patent Application No. 2006-500961, Office Action from the Japanese Patent Office, English Translation of the Notification of Reasons for Refusal, dated Nov. 2, 2009, citing prior art, p. 5.

*Primary Examiner* — Ian Jen

(74) *Attorney, Agent, or Firm* — Marsh FIschmann & Breyfogle, LLP; Kent A. Lembke

(57) ABSTRACT

A system for producing motions for an animatronic figure is disclosed. The system is configured to produce different types of motions in real-time and in a life-like manner. The motion software module forms a composite motion by combining the user-inputted motion with user-selected fixed sequences and/or with algorithmically calculated motion. The motions of the animatronic figure can further be filtered to produce motions that are life-like. Combined motions are formed by superimposing, modulating, or modifying component motions. Motions are filtered based on user-inputted commands and commands determined from a stimulus and filtered to create a life-like motion.

27 Claims, 17 Drawing Sheets

U.S. PATENT DOCUMENTS

| | | | |
|---|---|---|---|
| 4,840,242 A | 6/1989 | Chih et al. | |
| 4,868,474 A | 9/1989 | Lancraft et al. | |
| 4,912,650 A | 3/1990 | Tanaka et al. | |
| 4,923,428 A * | 5/1990 | Curran | 446/175 |
| 5,008,834 A | 4/1991 | Mizuno et al. | |
| 5,021,878 A * | 6/1991 | Lang | 348/61 |
| 5,088,953 A * | 2/1992 | Richman | 446/351 |
| 5,121,805 A | 6/1992 | Collie | |
| 5,151,859 A | 9/1992 | Yoshino et al. | |
| 5,157,316 A | 10/1992 | Glovier | |
| 5,159,988 A | 11/1992 | Gomi et al. | |
| 5,221,883 A | 6/1993 | Takenaka et al. | |
| 5,270,480 A * | 12/1993 | Hikawa | 84/645 |
| 5,303,384 A | 4/1994 | Rodriguez et al. | |
| 5,353,886 A | 10/1994 | Paakkunainen | |
| 5,355,064 A * | 10/1994 | Yoshino et al. | 318/568.12 |
| 5,434,489 A | 7/1995 | Cheng et al. | |
| 5,484,031 A | 1/1996 | Koyachi et al. | |
| 5,493,185 A | 2/1996 | Mohr et al. | |
| 5,511,147 A | 4/1996 | Abdel-Malek | |
| 5,519,814 A | 5/1996 | Rodriguez et al. | |
| 5,644,204 A | 7/1997 | Nagle | |
| 5,697,829 A * | 12/1997 | Chainani et al. | 446/436 |
| 5,724,074 A * | 3/1998 | Chainani et al. | 345/474 |
| 5,746,602 A * | 5/1998 | Kikinis | 434/169 |
| 5,752,880 A * | 5/1998 | Gabai et al. | 463/1 |
| 5,784,541 A | 7/1998 | Ruff | |
| 5,794,166 A * | 8/1998 | Bauer et al. | 701/23 |
| 5,808,433 A | 9/1998 | Tagami et al. | |
| 5,838,130 A | 11/1998 | Ozawa | |
| 5,842,533 A | 12/1998 | Takeuchi | |
| 5,913,727 A * | 6/1999 | Ahdoot | 463/39 |
| 5,929,585 A | 7/1999 | Fujita | |
| 5,947,825 A * | 9/1999 | Horstmann et al. | 463/42 |
| 6,022,273 A * | 2/2000 | Gabai et al. | 463/39 |
| 6,053,797 A * | 4/2000 | Tsang et al. | 446/297 |
| 6,056,618 A * | 5/2000 | Larian | 446/73 |
| 6,075,195 A * | 6/2000 | Gabai et al. | 84/645 |
| 6,149,490 A * | 11/2000 | Hampton et al. | 446/353 |
| 6,192,215 B1 * | 2/2001 | Wang | 434/307 R |
| 6,206,745 B1 * | 3/2001 | Gabai et al. | 446/91 |
| 6,230,078 B1 | 5/2001 | Ruff | |
| 6,249,278 B1 | 6/2001 | Segan et al. | |
| 6,253,058 B1 * | 6/2001 | Murasaki et al. | 434/308 |
| 6,264,521 B1 * | 7/2001 | Hernandez | 446/73 |
| 6,290,566 B1 * | 9/2001 | Gabai et al. | 446/175 |
| 6,319,010 B1 * | 11/2001 | Kikinis | 434/169 |
| 6,330,494 B1 * | 12/2001 | Yamamoto | 700/261 |
| 6,352,478 B1 * | 3/2002 | Gabai et al. | 463/42 |
| 6,358,111 B1 * | 3/2002 | Fong et al. | 446/297 |
| 6,368,177 B1 * | 4/2002 | Gabai et al. | 446/404 |
| 6,377,281 B1 | 4/2002 | Rosenbluth et al. | |
| 6,452,348 B1 | 9/2002 | Toyoda | |
| 6,454,625 B1 * | 9/2002 | Fong et al. | 446/297 |
| 6,462,498 B1 * | 10/2002 | Filo | 318/568.12 |
| 6,493,606 B2 | 12/2002 | Saijo et al. | |
| 6,497,607 B1 * | 12/2002 | Hampton et al. | 446/301 |
| 6,514,117 B1 * | 2/2003 | Hampton et al. | 446/301 |
| 6,535,793 B2 * | 3/2003 | Allard | 700/259 |
| 6,537,128 B1 * | 3/2003 | Hampton et al. | 446/301 |
| 6,544,098 B1 * | 4/2003 | Hampton et al. | 446/301 |
| 6,584,377 B2 | 6/2003 | Saijo et al. | |
| 6,629,087 B1 | 9/2003 | Benson et al. | |
| 6,663,393 B1 * | 12/2003 | Ghaly | 434/262 |
| 6,667,593 B2 * | 12/2003 | Inoue et al. | 318/568.2 |
| 6,773,322 B2 * | 8/2004 | Gabai et al. | 446/91 |
| 6,800,013 B2 * | 10/2004 | Liu | 446/297 |
| 6,937,289 B1 * | 8/2005 | Ranta et al. | 348/460 |
| 6,959,166 B1 * | 10/2005 | Gabai et al. | 434/308 |
| 7,059,933 B1 * | 6/2006 | Hsiao et al. | 446/297 |
| 7,065,490 B1 * | 6/2006 | Asano et al. | 704/275 |
| 7,219,064 B2 * | 5/2007 | Nakakita et al. | 704/275 |
| 7,260,430 B2 * | 8/2007 | Wu et al. | 600/545 |
| 7,308,335 B2 * | 12/2007 | Takenaka et al. | 700/245 |
| 2001/0004195 A1 * | 6/2001 | Barr | 318/568.1 |
| 2001/0027397 A1 * | 10/2001 | Yeon | 704/272 |
| 2001/0031652 A1 * | 10/2001 | Gabai et al. | 463/1 |
| 2001/0049248 A1 * | 12/2001 | Choi | 446/356 |
| 2002/0016128 A1 * | 2/2002 | Saito | 446/268 |
| 2002/0024447 A1 * | 2/2002 | Fong et al. | 340/825.22 |
| 2002/0029388 A1 * | 3/2002 | Heisele | 725/74 |
| 2002/0061700 A1 * | 5/2002 | Chan | 446/175 |
| 2002/0061708 A1 * | 5/2002 | Fong et al. | 446/297 |
| 2002/0086607 A1 * | 7/2002 | Chan | 446/175 |
| 2002/0107591 A1 * | 8/2002 | Gabai et al. | 700/94 |
| 2002/0120362 A1 * | 8/2002 | Lathan et al. | 700/245 |
| 2002/0187722 A1 * | 12/2002 | Fong et al. | 446/175 |
| 2002/0193908 A1 * | 12/2002 | Parker et al. | 700/258 |
| 2003/0110040 A1 * | 6/2003 | Holland et al. | 704/275 |
| 2003/0124954 A1 * | 7/2003 | Liu | 446/484 |
| 2003/0162475 A1 * | 8/2003 | Pratte et al. | 446/175 |
| 2004/0088080 A1 * | 5/2004 | Song et al. | 700/259 |
| 2005/0283043 A1 * | 12/2005 | Sisk | 600/38 |
| 2006/0084362 A1 * | 4/2006 | Ghaly | 446/484 |
| 2006/0094332 A1 * | 5/2006 | Ghaly | 446/484 |
| 2006/0260087 A1 * | 11/2006 | Im et al. | 15/319 |
| 2007/0099538 A1 * | 5/2007 | Friedland et al. | 446/342 |

FOREIGN PATENT DOCUMENTS

JP 2002210679 A1 7/2002

* cited by examiner

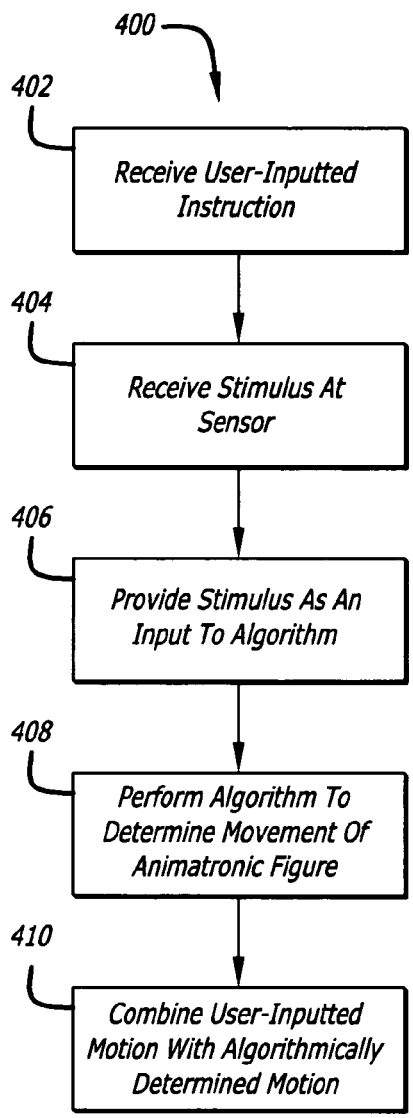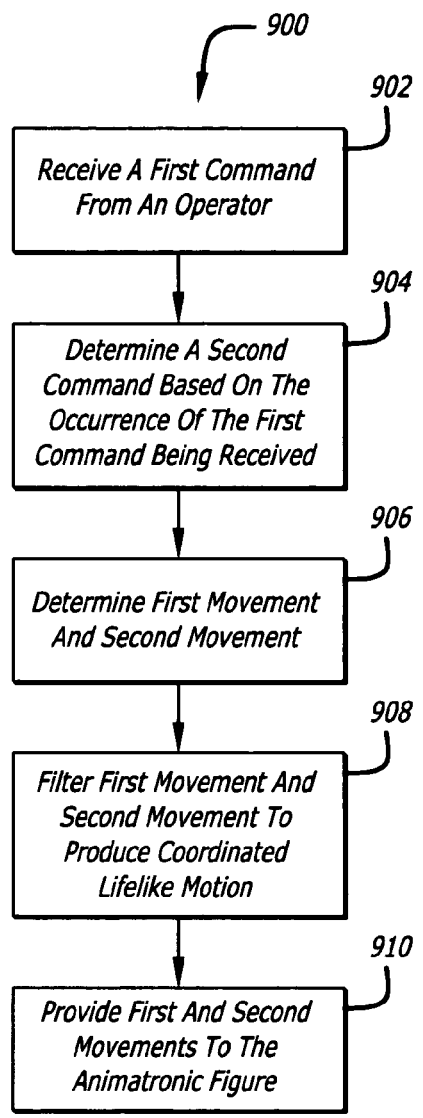
FIG. 4
FIG. 9A

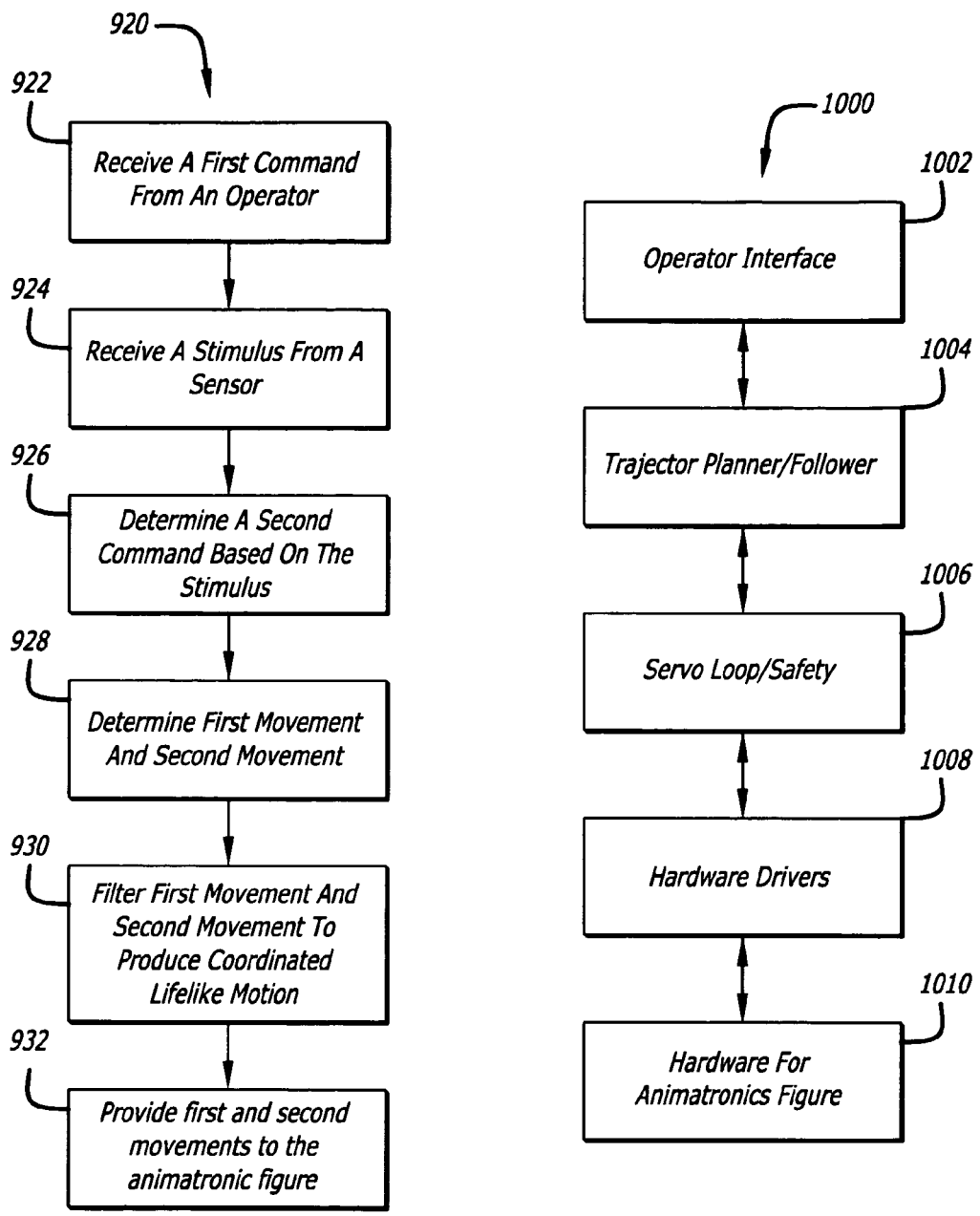

```
Keyframe ((0),     // Start at position 0
          1,       // 1 second between keyframes
          (10),    // Second position is at 10
          1,       // 1 second between keyframes
          (-10),   // Third position is at -10
          1,       // 1 second between keyframes
          (0));    // Final position at 0
```

```
//
// Define a variable that reads in a raw value
// Variables for accessing raw inputs are pre-defined
//    such as the value Encoder_14 used here
//
float joystick = Encoder_14;

//
// Define the envelope trajectory
//
Traj envelope {
    return
        Keyframe ( (0),         // start at zero
                   5,           // move over 5 seconds
                   (1, 0),      // position = 1, velocity = 0
                   5,           // move over 5 seconds
                   (0));        // end at zero
}

//
// Define a resulting composite trajectory
//
Traj resulting_composite_trajectory { return
    //
    // Multiply a sine wave by an envelope
    //
    (
        Sine (1,                // Sine's frequency in Hz
              10,               // Sine's amplitude
              0)                //  Sine's phase in radians
        *
        envelope                // This trajectory was defined above
    )
//
// Add in a filtered version of the joystick
//
    + Lowpass (0.2,             // Filter's cutoff frequency in Hz
              joystick);        // Variable defined above
}
```

*FIG. 18*

COMPUTING ENVIRONMENT THAT PRODUCES REALISTIC MOTIONS FOR AN ANIMATRONIC FIGURE

RELATED APPLICATIONS

This application is a continuation-in-part and claims priority to U.S. patent application Ser. No. 10/757,797, entitled "ANIMATRONIC SUPPORTED WALKING SYSTEM" filed on Jan. 14, 2004 by Akhil Jiten Madhani, Holger Irmler, Alexis P. Wieland, and Bryan S. Tye, now U.S. Pat. No. 7,238,079, which is hereby incorporated by reference in its entirety.

SURROUNDING BACKGROUND

1. Field

A system and method are disclosed, which generally relate to robotic figures, and more specifically to animatronic figures.

2. Surrounding Background

An animatronic figure is a robotic figure, puppet, or other movable object that is animated via one or more electromechanical devices. The term "animated" is meant to be interpreted as to move to action. The electromechanical devices include electronics, mechanical, hydraulic, and/or pneumatic parts. Animatronic figures are popular in entertainment venues such as theme parks. For example, animatronic characters can be seen in shows, rides, and/or other events in a theme park. The animatronic character's body parts, such as the head and the arms, may generally move freely. However, the animatronic character is usually incapable of freely roaming or walking from one place to another.

Various animatronic systems have been created over a number of decades to control the animatronic figure. The control of these systems has steadily progressed over the last forty years from mechanical cams to mini computers to board-based systems, but the underlying approach has changed little.

In general, a current animatronic figure moves in a very mechanical fashion. In other words, the current animatronic figure gives the appearance of moving like a robot rather than giving the appearance of moving like a living creature.

SUMMARY

In one aspect, there is an animatronic system. A reception module receives a fixed show selection input and a puppetted input from an operator. The fixed show selection input is associated with at least one fixed show instruction. The puppetted input provides a puppetting instruction. There is an animatronic figure. A translation software module translates the at least one fixed show instruction associated with the fixed show selection input into at least one fixed show physical movement instruction and translates the received puppetted instruction into at least one puppetted physical movement instruction. A motion software module receives the at least one fixed show physical movement instruction, receives the at least one puppetted physical movement instruction, and calculates a composite animated instruction from the at least one fixed show physical movement instruction and the at least one puppetted physical movement instruction so that at least one actuator can effectuate at least one component of the animatronic figure in a life-like manner.

In another aspect, there is an animatronic system. An audio software module provides an instruction to an audio device to output an audio signal when the motion of the at least one component of the animatronic figure is effectuated.

In one aspect, there is an animatronic system. An automatic fixed show software module automatically provides the fixed show selection input to the reception module at a predetermined time.

In another aspect, there is an animatronic system. A predetermined time coincides with a time that the operator provides the puppetted input.

In one aspect, there is an animatronic system. The operator presses a button to provide the fixed show selection input.

In another aspect, there is an animatronic system. A sensor is operably connected to the animatronic figure that determines the occurrence of an event.

In one aspect, there is an animatronic system. The occurrence of an event triggers the fixed show selection input to be inputted to the reception module.

In another aspect, there is an animatronic system. The operator turns a dial to provide the fixed show selection input to the reception module.

In one aspect, there is a method that produces motion of an animatronic figure. A puppetting instruction is provided to the animatronic figure to perform a puppetting movement. A fixed show selection is associated with at least one fixed show instruction to the animatronic figure to perform a fixed show movement. The puppetting instruction is combined with the at least one fixed show instruction to form a combined instruction. The animatronic figure is instructed to perform the combined instruction.

In another aspect, there is a method that produces motion of an animatronic figure. The fixed show selection is provided by the user.

In one aspect, there is a method that produces motion of an animatronic figure. Instructing the animatronic figure to perform the combined instruction results in a composite movement of the puppetted movement and the fixed show movement.

In another aspect, there is a method that produces motion of an animatronic figure. The puppetted movement is to be performed by the same component of the animatronic figure as the fixed show movement.

In one aspect, there is a method that produces motion of an animatronic figure. The puppetted movement is to be performed by a different component of the animatronic figure than the fixed show movement.

In another aspect, there is an animatronic system. There is an animatronic figure. A reception module receives a first command and a second command from an operator. The reception module is operably connected to the animatronic figure. The reception module communicates with the animatronic figure. The animatronic figure makes a first movement according to the first command. The animatronic figure makes a second movement according to the second command. A filter module filters the first command through a first filter and filters the second command through a second filter to coordinate a first movement of the animatronic figure resulting from the first command with a second movement of the animatronic figure resulting from the second command so that the motion of the animatronic figure provides a life-like appearance.

In one aspect, there is an animatronic system. The first command is a puppetted instruction.

In another aspect, there is an animatronic system. The second command is a fixed show selection that is associated with at least one fixed show instruction.

In one aspect, there is an animatronic system. The first filter is a low pass filter.

In another aspect, there is an animatronic system. The second filter is a high pass filter.

In one aspect, there is an animatronic system. The second filter is a band pass filter.

In another aspect, there is an animatronic system. The first filter and the second filter are used on different components of the same body part of the animatronic figure.

In one aspect, there is an animatronic system. The first filter and the second filter are used on different body parts of the animatronic figure.

In another aspect, there is an animatronic figure. There is a leg. A leg actuator is operably connected to the leg, wherein the leg actuator effectuates movement of the leg. There is a wheel. A wheel actuator is operably connected to the wheel, wherein the wheel actuator effectuates movement of the wheel. A processor determines a leg motion and a wheel motion to effectuate movement of the animatronic figure. The processor sends the leg motion to the leg actuator. The processor sends the wheel motion to the wheel actuator.

In one aspect, there is an animatronic figure. A position sensor determines a first current position of the animatronic figure.

In another aspect, there is an animatronic figure. An incremental sensor measures a second current relative position of the animatronic figure by incrementing the distance traveled from an initial position of the animatronic figure.

In one aspect, there is an animatronic figure. A clipping module determines if the difference between the second current position of the animatronic figure and the first current position of the animatronic figure has reached a positional clipping limit.

In another aspect, there is an animatronic figure. A clipping module determines if the velocity of the animatronic figure in moving from the first current position to the second current position has reached a velocity-clipping limit in addition to reaching the positional clipping limit.

In one aspect, there is an animatronic figure. A clipping module determines if the velocity of the animatronic figure in moving from the first current position to the second current position has reached a clipping limit.

In another aspect, there is an animatronic figure. A clipping module determines if the acceleration of the animatronic figure in moving from the first current position to the second current position has reached a clipping limit, separately or in conjunction with a position-clipping limit and/or with a velocity-clipping limit.

In one aspect, there is an animatronic figure. The clipping module shortens a trajectory of the animatronic figure if the clipping limit has been reached.

In another aspect, there is an animatronic figure. The clipping module reduces a velocity of the animatronic figure if the clipping limit has been reached.

In one aspect, there is an animatronic figure. The clipping module reduces an acceleration of the animatronic figure if the clipping limit has been reached.

In another aspect, there is a method that produces motion of an animatronic figure. A puppetted instruction is provided to the animatronic figure to perform a puppetted movement. A fixed show selection command is provided to the animatronic figure to perform at least one fixed show movement associated with the fixed show selection. The puppetted movement and the fixed show movement are combined into a composite movement. The animatronic figure is instructed to perform the composite movement.

In one aspect, there is a method that produces motion of an animatronic figure. The fixed show selection is provided by the user.

In another aspect, there is a method that produces motion of an animatronic figure. The puppetted movement and the at least one fixed show movement is a composite of the puppetted movement and the fixed show movement.

In one aspect, there is a method that produces motion of an animatronic figure. The puppetted movement is on the same component of the animatronic figure as the fixed show movement.

In another aspect, there is a method that produces motion of an animatronic figure. The puppetted movement is on a different component of the animatronic figure than the fixed show movement.

In one aspect, there is a method that produces motion of an animatronic figure. A pre-determined limit reduces the composite of the puppetted movement and the fixed show movement.

In another aspect, there is an animatronic system. There is an animatronic figure. A reception module receives a first command from an operator. The reception module is operably connected to the animatronic figure. The reception module communicates with the animatronic figure. The first command is used by the animatronic system as part of a calculation to determine a first movement. An algorithmic response module provides a second command to the animatronic figure based on the occurrence of the first command being provided to the animatronic figure. The algorithmic response module receives the first command from the reception module. The animatronic figure makes a second movement according to the second command.

In one aspect, there is an animatronic system. The first command is a puppetted instruction.

In another aspect, there is an animatronic system. The second command is a fixed show selection input associated with at least one fixed show instruction.

In one aspect, there is an animatronic system. The second command is an animatronic fixed show instruction that is based on the occurrence of a sensor operably connected to the animatronic figure detecting a stimulus.

In another aspect, there is an animatronic system. A filter module filters the first movement through a first filter and filters the second movement through a second filter to coordinate the first movement with the second movement so that the motion of the animatronic figure provides a life-like appearance.

BRIEF DESCRIPTION OF THE DRAWINGS

By way of example, reference will now be made to the accompanying drawings.

FIG. 4 illustrates a process that combines a user-inputted instruction with an algorithmically determined instruction.

FIG. 9A illustrates a process for filtering motions of the animatronic figure based on a user-inputted command and a command determined by the occurrence of the user-inputted command.

FIG. 9B illustrates a process for filtering motions of the animatronic figure based on a user-inputted command a command that is determined from a stimulus.

FIG. 10 illustrates a layered system of software modules.

FIG. 18 illustrates an example script for the composite trajectory shown in FIG. 12.

DETAILED DESCRIPTION

A computing environment is disclosed, which provides greater flexibility for controlling animatronic systems than previously seen and provides the ability to produce real-time composite motions. This computing environment can be applied to robotic systems generally and is not limited to only animatronic systems. Further, this computing environment is not limited to any particular programming language. In one embodiment, a scripting language is used to provide a programmer with a high level tool that instructs the animatronic figure to create and produce real, life-like motions.

Various features of this computing environment are described below with respect to an animatronic system. In one embodiment, the computing environment provides resources for different types of shows that the animatronic figure can perform, the combination and sequencing of the movements in these shows to produce life-like movements in real-time, calculations of trajectories for real-time movements, and/or filtering of the animatronic figure's movements. These and other features will be discussed below.

Figure 1:
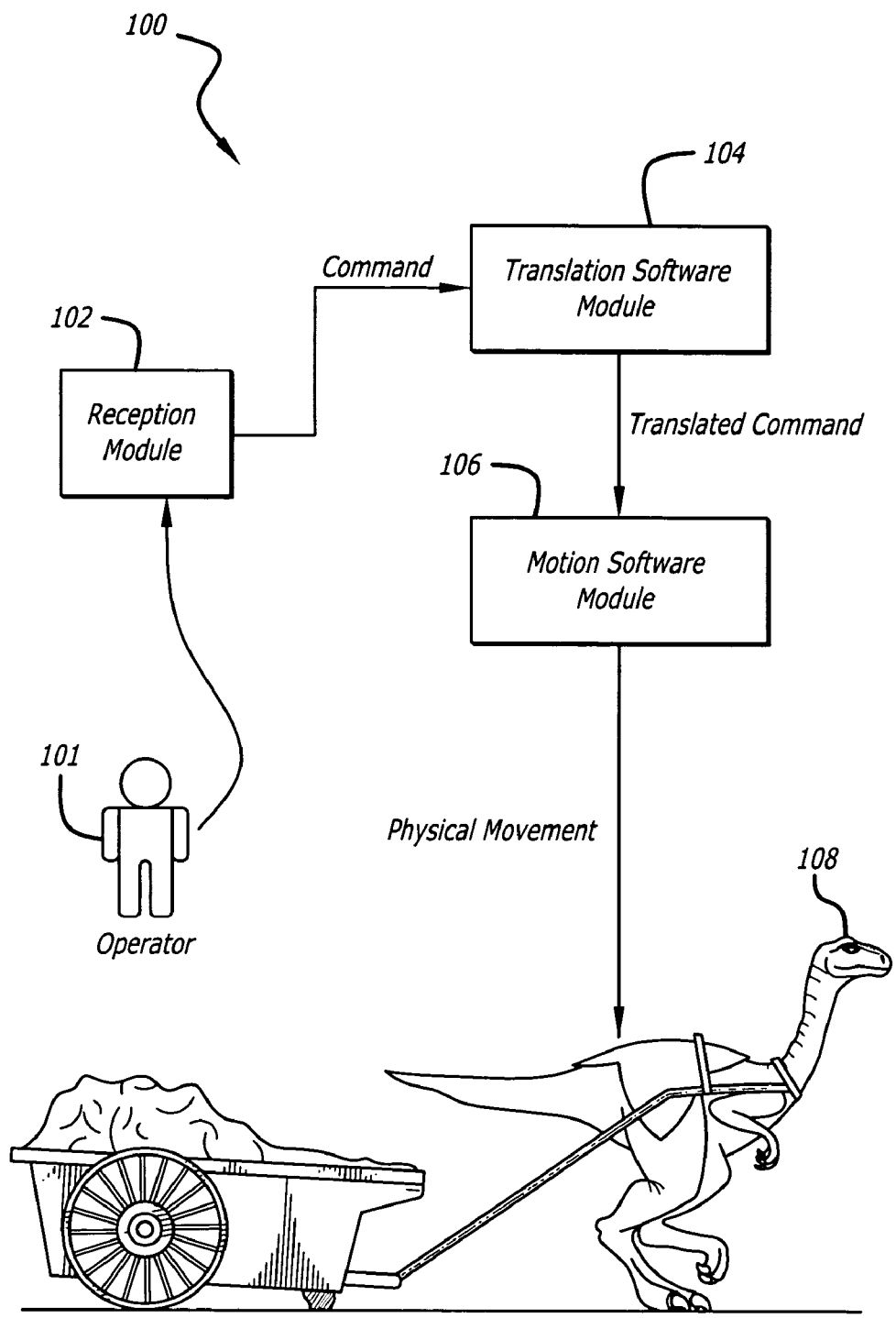
FIG. 1 illustrates an animatronic system, which is configured to produce different types of shows in real-time and in a life-like manner.

FIG. 1 illustrates an animatronic system 100, which is configured to produce different types of shows in real-time and in a life-like manner. A show is a sequence of movements of an animatronic figure 108 animated by the animatronic system 100.

One type of show is a puppetted show. The puppetted show is a sequence of movements that are operator-controlled. In other words, an operator 101 manually inputs the desired movements of the animatronic figure 108 into the animatronic system 100. Upon the user manually inputting each desired motion, the animatronic figure 108 produces a corresponding motion in a real-time fashion. The animatronic system 100 instructs the animatronic figure 108 to produce the desired motion instantly or in a short time period after the user manually inputs the desired motion command. Therefore, the animatronic figure 108 appears to be moving according to the desired motion as the user is entering the desired motion into the animatronic system 100. One of ordinary skill in the art will recognize examples of puppetted shows such as the MUPPETS or the puppets in the live stage adaptation of Disney's "The Lion King" which originally played in the New Amsterdam Theater in New York, N.Y. in 1997.

In one embodiment, the user inputs the puppetted motions through a joystick or other analog input device. In another embodiment, the user inputs the puppetted motions through a keyboard. In yet another embodiment, the user inputs the puppetted motions through sensors attached to the user's body. In another embodiment, face tracking is used to input the puppetted motions. Face tracking detects movements of the face and/or head. A camera can be focused on the face and/or head to receive the puppetted motion. Sensors can also be placed on the head to receive the puppetted motion. For instance, the operator 101 can wear a headband that has sensors on it for detecting movement of the head. In yet another embodiment, the user inputs the puppetted motions through voice commands into a microphone that operates in conjunction with voice recognition software.

Another type of show is a fixed show. The fixed show is a recordation of pre-animated sequences that can be played back either once or continuously in a loop. The operator 101 can simply select a fixed show and animate the animatronic figure 108 without having to input each movement while the show is playing, as the operator 101 would do if providing a puppetted instruction. One of ordinary skill in the art will recognize examples of fixed shows such as the "Enchanted Tiki Room" shown at Disneyland in 1963 and "Great Moments with Mr. Lincoln" originally shown at the New York world's fair in 1964 and moved to Disneyland in 1965.

A few different methods exist for creating a fixed show. In one embodiment, the fixed show is a recordation of the user puppetting a sequence of movements. In another embodiment, the fixed show is a recordation of movements that a user enters through a graphical user interface ("GUI"). In another embodiment, motions are derived from other sources, such as deriving mouth positions from analyzing recorded speech. In another embodiment, a combination of these approaches is used. In one embodiment, the instructions for the fixed show are stored on a computer-readable medium.

In one embodiment, the user inputs the selection of the fixed show through a button (not shown) that instructs the animatronic system 100 to animate the animatronic figure 108 according to the pre-recorded motions of the fixed show that is selected. A plurality of buttons can be provided with each button representing a different fixed show selection. In other words, the operator 101 can have a variety of fixed show selections from which to choose. Each of the fixed show selections is associated with a set of pre-recorded movements. When the operator 101 makes a fixed show selection, the animatronic system 100 performs the set of pre-recorded movements associated with the fixed show selection. In essence, the operator 101 only has to provide one command to the animatronic system 100 to choose a fixed show selection. The animatronic system instructs the animatronic figure 108 to perform the instructions associated with the fixed show selection made by the operator 101.

In another embodiment, the user inputs the selection of the fixed show with a touch screen display. In another embodiment, the user inputs the selection of the fixed show through a dial. In another embodiment, the user inputs the selection of the fixed show through voice commands into a microphone that operates in conjunction with voice recognition software.

The animatronic system 100 provides the user with the ability to animate the animatronic figure 108 according to a fixed show and a puppetted show simultaneously. If a fixed show provides an instruction to one actuator while the puppetted sequence provides an instruction to a different actuator, both instructions are performed simultaneously to give the appearance that two different body parts are moving simultaneously.

If the fixed show provides an instruction to the same actuator as the puppetted show, a composite motion is calculated. The composite motion is calculated so that the composite motion appears life-like. For example, if a fixed show is a sneezing motion and a puppetted motion is moving the head forward, a simple superimposition of the fixed show instruction and the puppetted motion would lean the head forward more so than if only the puppetted instruction was given. In another embodiment, the composite motion is formed, by multiplying motions to increase or reduce a component motion. For example, the amplitude that the tail wags can be increased when a laugh is played. In another embodiment, the composite motion is formed by modulating component motions. For example, the frequency of the breathing motion can increase when a strenuous motion is played. This combination parallels the motion of a living creature that would have, in the sneezing example, an exaggerated movement of the head forward if a sneeze occurred during the forward motion of the head.

Accordingly, the composite motion may appear to be too exaggerated of a motion to appear life-like. In the sneezing example, the head may move too far forward during the combined forward motion and the sneeze to appear life-like. In order to correct this behavior, the composite motion can be clipped. The term clipping refers to the reduction of a value to fall within a predetermined limit. In one embodiment, the trajectory of the composite motion of the animatronic figure 108 can be clipped. In other words, the forward trajectory of the composite motion of the head in the sneezing example can be shortened to meet the predetermined limit of how far the head can move forward. An example of the predetermined limit would be stopping the head of the animatronic figure 108 from touching the ground. In addition, clipping ensures that the range limits for the actuators of the animatronic figure 108 that perform the movement are complied with. For instance, if the operator 101 provides a puppetted instruction to move the head of the animatronic figure 108 too far backwards, a hard stop will be encountered. By the term hard stop, one of ordinary skill in the art will recognize that the actuators will hit a physical end stop or barrier restricting the motion of the robot. A wide variety of problems may result from hitting a hard stop. For instance, it may be possible to hit the hard stop with enough force to physically damage the robotic figure. Furthermore, other actuators that depend on the movements of the affected actuators may then also malfunction. In essence, hitting a hard stop could potentially lead to a complete malfunction of the animatronic figure 108. Clipping prevents a hard stop from being reached, thereby reducing the potential of a malfunction. In one embodiment, a clipping module determines if the difference between a second current position of the animatronic figure 108 and a first current position of the animatronic figure 108 has reached a positional clipping limit.

In another embodiment, the velocity of the composite motion of the animatronic figure 108 can be clipped. In other words, the speed at which a body part of the animatronic figure 108 is moving can be reduced to fall within a predetermined limit. For example, in the sneezing example, the predetermined limit can be set to one hundred degrees per second to assure that the sideways movement of the head does not exceed a potentially dangerous speed. In addition, clipping prevents structural constraints from being reached. For instance, a motor has a limit on the velocity the motor can produce. If the animatronic figure 108 attempts to reach or surpass this velocity limit, the motor may simply malfunction. In another embodiment, the clipping module determines if a velocity clipping limit has been reached. In yet another embodiment, the clipping module determines if the positional clipping limit and the velocity clipping limit has been reached.

In yet another embodiment, the acceleration of the animatronic figure 108 can be clipped. In other words, the change in the speed at which a body part is moving can be reduced to fall within a predetermined limit. Since the required motor torque is proportional to acceleration, this can be used to effectively limit the torque required by the actuators as well as make motions that are smooth and life-like. Clipping range of a joint's motion by simply limiting the allowed range will cause the joint to suddenly stop when it reaches the end of its range. This sudden stop may cause an acceleration that exceeds the predetermined acceleration limit. When a joint has clipping simultaneously for both position and acceleration it is necessary to reduce the velocity in the direction of the position-clipping limit as the joint reaches that position-clipping limit. This reduced velocity limit near the position limit ensures that the acceleration limit is respected when position clipping occurs. In yet another embodiment, the clipping module determines if an acceleration clipping limit has been reached. The clipping module can also determine any combination of position, velocity, and/or acceleration being clipped.

In one embodiment, a reception module 102 receives operator input commands for controlling the animatronic figure 108. In one embodiment, the reception module 102 is a software program that receives user inputs from a hardware device such as a joystick. The joystick sends control inputs for adjusting the character's movements. The control inputs are, for example, analog and/or digital signals for adjusting the character's puppetting motions. In another embodiment, the reception module 102 is a software program that receives user inputs from a hardware device such as a keyboard that sends control inputs, such as analog and/or digital signals, to adjust the character's movements. In another embodiment, an operator presses a button to provide control inputs. In another embodiment, the operator turns a dial to provide control signals to the animatronic figure. The control signals are input into the translation software module 104.

For example, an operator of an amusement park ride rotates a joystick to control the head and the neck of the animatronic figure 108 for the viewing enjoyment of park patrons. In another example, an operator of the animatronic figure 108 enters a keyboard command to move the legs of the animatronic figure 108, altering the direction of travel of the animatronic figure 108 from a forward direction to a right turn to avoid a collision course with a park patron. The use of the keyboard may be particularly helpful in a debugging environment for debugging the animatronic figure 108. The user can debug the animatronic figure 108 by entering commands to the keyboard one command at a time to analyze individual motions. Similarly, the user can also provide a plurality of commands through the keyboard to analyze the individual motions.

The translation software module 104 converts the fixed show instruction associated with the fixed show selection into at least one physical movement instruction. Further, the translation software module can also convert the puppetted instruction into at least one physical movement instruction. First, the translation software module 104 evaluates a fixed show instruction associated with the fixed show selection. In one embodiment, a computer program is loaded from a memory device.

In one embodiment, the reception module 102, the translation software module 104, and the motion software module are all stored on different computers. In one embodiment, the reception module 102 does not need to be stored on a computer. Rather, the reception module 102 can be a simple input device. In another embodiment, the reception module 102 and the translation software module 104 are stored on the same computer but a different computer than the computer on which the motion software module 106 is stored. In yet another embodiment, the reception module 102 and the motion software module 106 are stored on the same computer but on a different computer than the computer on which the translation software module 104 is stored. In another embodiment, the translation software module 104 and the motion software module 106 are stored on the same computer but on a different computer than the computer on which the reception module 102 is stored. One of ordinary skill in the art will also recognize that one computer software module can perform the functions of all or some of these modules. For instance, one software module can perform the functions of the reception module and the translation software module.

Figure 2:
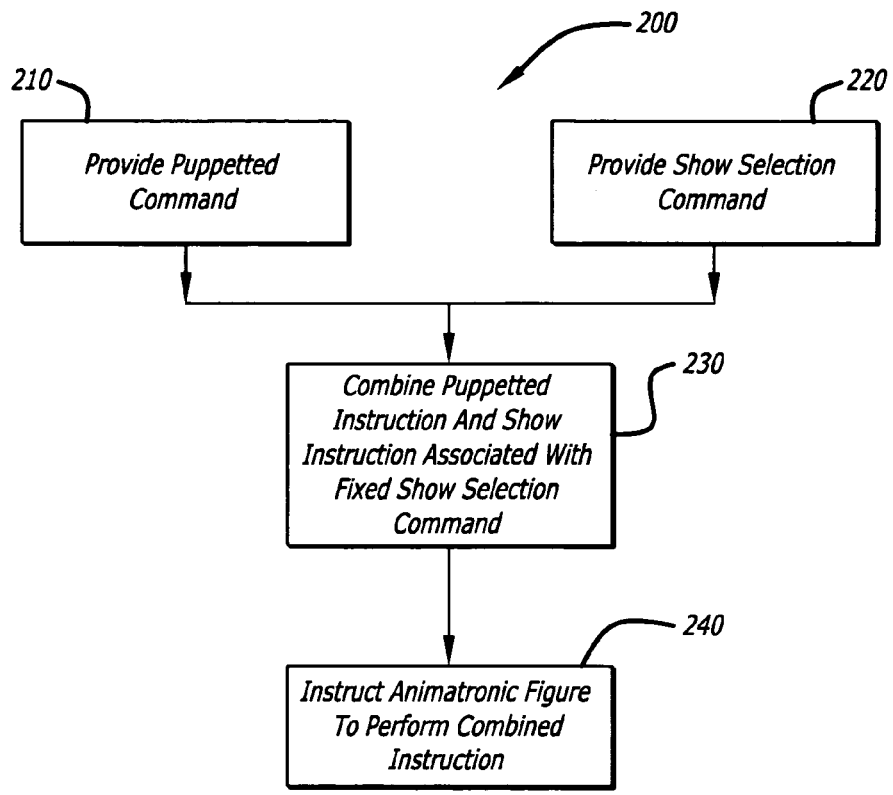
FIG. 2 illustrates a process that produces motion of the animatronic figure.

FIG. 2 illustrates a process 200 that produces motion of the animatronic figure 108. In a process block 210, the user provides a puppetted instruction to the animatronic system 100 to perform a puppetted movement. At a process block 220, the user provides a fixed show selection associated with at least one fixed show instruction to the animatronic system 100 to perform a fixed show movement. In one example, the fixed show instruction includes a control signal for making the animatronic figure growl.

In a process block 230, a combined instruction results from the combination of the puppetted instruction and the fixed show instruction. In another embodiment, a combined instruction results from the superimposition of the puppetted instruction and the fixed show instruction. In a process block 240, the animatronic system 100 instructs the animatronic figure 108 to move according to the combined instruction. In another embodiment, a combined instruction results from multiplying the puppetted instruction and the fixed show instruction. In another embodiment, a combined instruction results from the modulation of the puppetted instruction by the fixed show instruction.

For example, an operator provides, through keyboard input, a puppetted instruction to raise the animatronic character's leg. In one embodiment, the puppetted input is stored in a memory device within a computer. Afterwards, the operator presses a button operably connected to the animatronic character to request a fixed show selection that is associated with at least one fixed show instruction for the character to growl. A processor within the computer superimposes the instruction to raise the animatronic character's 108 leg with the instruction to growl. The animatronic system 100 then causes the animatronic figure 108 to raise its leg and to growl.

Figure 3A:
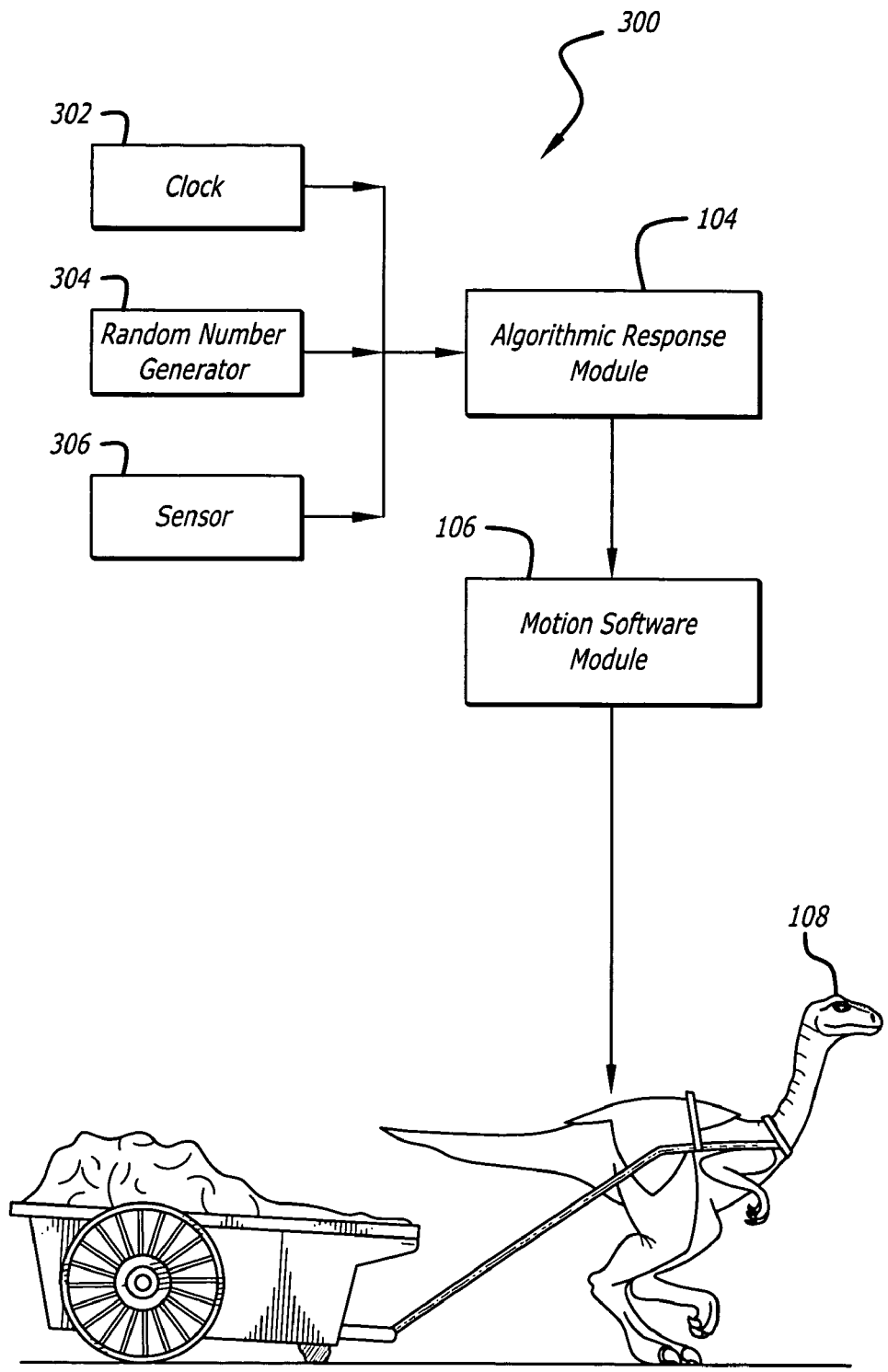
FIG. 3A illustrates an algorithmic configuration, which determines movements of the animatronic figure according to an algorithm.

FIG. 3A illustrates an algorithmic configuration 300, which determines movements of the animatronic figure 108 according to an algorithm. In other words, the animatronic system 100 analyzes a variety of conditions to determine if the algorithm should be run and/or what motion should be produced. The condition can be an environmental occurrence, a motion resulting from a puppetted instruction, or a motion resulting from a fixed show selection. If one of the conditions is met, the algorithm performs a real time determination or modification of the motion that should be produced by the animatronic figure 108.

In one embodiment, an algorithmic response module 308 determines whether a condition has been met so that an algorithm can be run. In one embodiment, the algorithmic response module accesses a database that stores a condition and an algorithm to be run if the condition is met. In another embodiment, the database can store a condition and an instruction to be performed if the condition is met. In another embodiment, the algorithmic response module 308 determines the direction of the resulting motion. In another embodiment, the algorithmic response module 308 determines the magnitude of the resulting motion. In another embodiment, the algorithmic response module 308 determines the duration of the resulting motion. In another embodiment, the algorithmic response module 308 determines the sequence of motions to follow or how many times an individual motion repeats.

In one embodiment, a clock 302 provides the time to the algorithmic response module 308. One of the conditions can be that the animatronic figure 108 wags its tail at a particular time or at a particular frequency. For instance, an algorithm can be run so that the animatronic figure 108 wags its tail at one o'clock p.m. every day. The algorithmic response module 308 can receive the time from the clock 302 and determine that the time condition for wagging the tail of the animatronic figure 108 has been satisfied at one o'clock p.m. In another embodiment, the tail can be set to wag at one Hertz. The algorithmic response module 308 can receive the time from the clock and use that to determine the current position based on the one Hertz wagging motion. The algorithmic response module then provides an instruction and associated data to the motion software module 106 for the animatronic figure 108 to wag its tail. In one embodiment, the algorithmic response module 308 performs the calculations for position, velocity, and acceleration and provides the data to the motion software module 106. In another embodiment, the motion software module 106 performs the calculations for position, velocity, and acceleration. In yet another embodiment, the algorithmic response module 308 is the same module as the motion software module 106.

In another embodiment, an algorithm is provided that calculates a breathing motion for the animatronic figure 108. In other words, a breathing noise can be produced and the chest of the animatronic figure 108 can heave in and out. The breathing motion can be based on the time input of the clock 302 to the animatronic response module 308.

In another embodiment, a random number generator 304 provides an input to the algorithmic response module 308. An algorithm can be set to receive random numbers from the random number generator 304 to instruct the animatronic figure 108 to perform a motion at random times. For instance, the animatronic figure 108 can be instructed to blink at random times. The user of the random number generator 304 provides a more life-like appearance to the movement of the animatronic figure 108 as blinking is naturally a random movement. In another embodiment, the random number generator 304 may provide a random amplitude for a motion. In another embodiment, the random number generator 304 may provide a random direction for a motion. In another embodiment, the random number generator 304 may provide a random component of a motion. An example of a random component would be a breathing motion that occurs at a randomly varying frequency, amplitude, and offset.

In another embodiment, a sensor 306 provides data to the algorithmic response module 308. In one embodiment, the data is environmental data. For instance, the environmental data can include a detection of a body part of the animatronic figure 108 moving too far in one direction towards an end stop. If the animatronic figure 108 is about to sneeze, while the head and neck are turned and therefore near the sideways end stop, the sneezing motion may cause the neck to turn further and clipping of the motion occur. It is preferable in that case for the sneeze to turn the head away from the end stop, which is toward the center of the neck's range of motion, so that clipping does not occur. In this example, the direction and the magnitude of the head turn during the sneeze would be the algorithmic response to the neck position sensor.

The sensed condition can be the occurrence of the motion of any body part regardless of whether the motion results from a puppetted instruction or from a fixed show selection. In one embodiment, a condition is established such that the motion of a first body part invokes an algorithm to produce a motion for a second body part in the same vicinity. The algorithm calculates the second motion such that the first motion and the second motion appear to provide a coordinated life-like movement. For instance, the condition can be a downward motion of the head of the animatronic figure 108. The algorithmic response module 308 can then calculate a motion, which causes the animatronic figure 108 to lean forward and crouch slightly in a coordinated manner with the motion of the head of the animatronic figure 108.

Figure 3B:
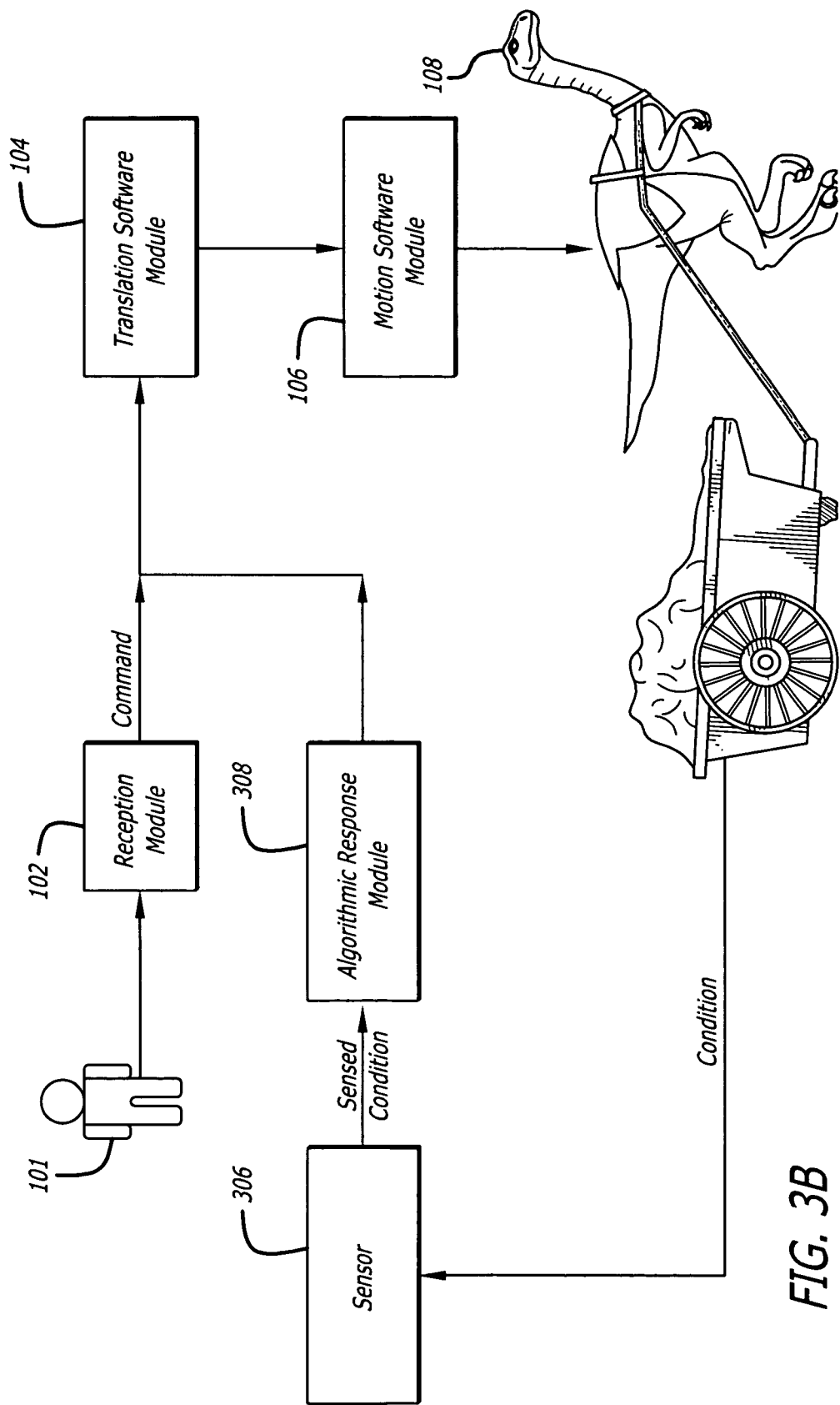
FIG. 3B illustrates one embodiment of the algorithmic configuration 300 in which the sensor provides a sensed condition to the algorithmic response module.

FIG. 3B illustrates one embodiment of the algorithmic configuration 300 in which the sensor 306 provides a sensed condition to the algorithmic response module 308. In one embodiment, the sensor 306 receives the condition from the animatronic figure 108. The sensor 306 provides the sensed condition to the algorithmic response module 308, which then calculates a motion according to an algorithm. The motion is then provided to the translation software module 104. In addition, the reception module 102 receives an input from a user 101. The translation software module 104 translates the user-inputted motion, combines this with the algorithmically computed response, and produces at least one physical movement instruction. The motion software module then instructs the animatronic figure 108 to move according to the physical movement instruction. In one embodiment, the motion software module 106 also performs the functions of the translation software module 104.

In one embodiment, the translation software module 104 forms a composite motion by combining the user-inputted motion with the algorithmically calculated motion. The animatronic figure 108 performs the composite motion in a life-like manner that coordinates both the user-inputted motion and the algorithmically calculated motion.

Figure 3C:
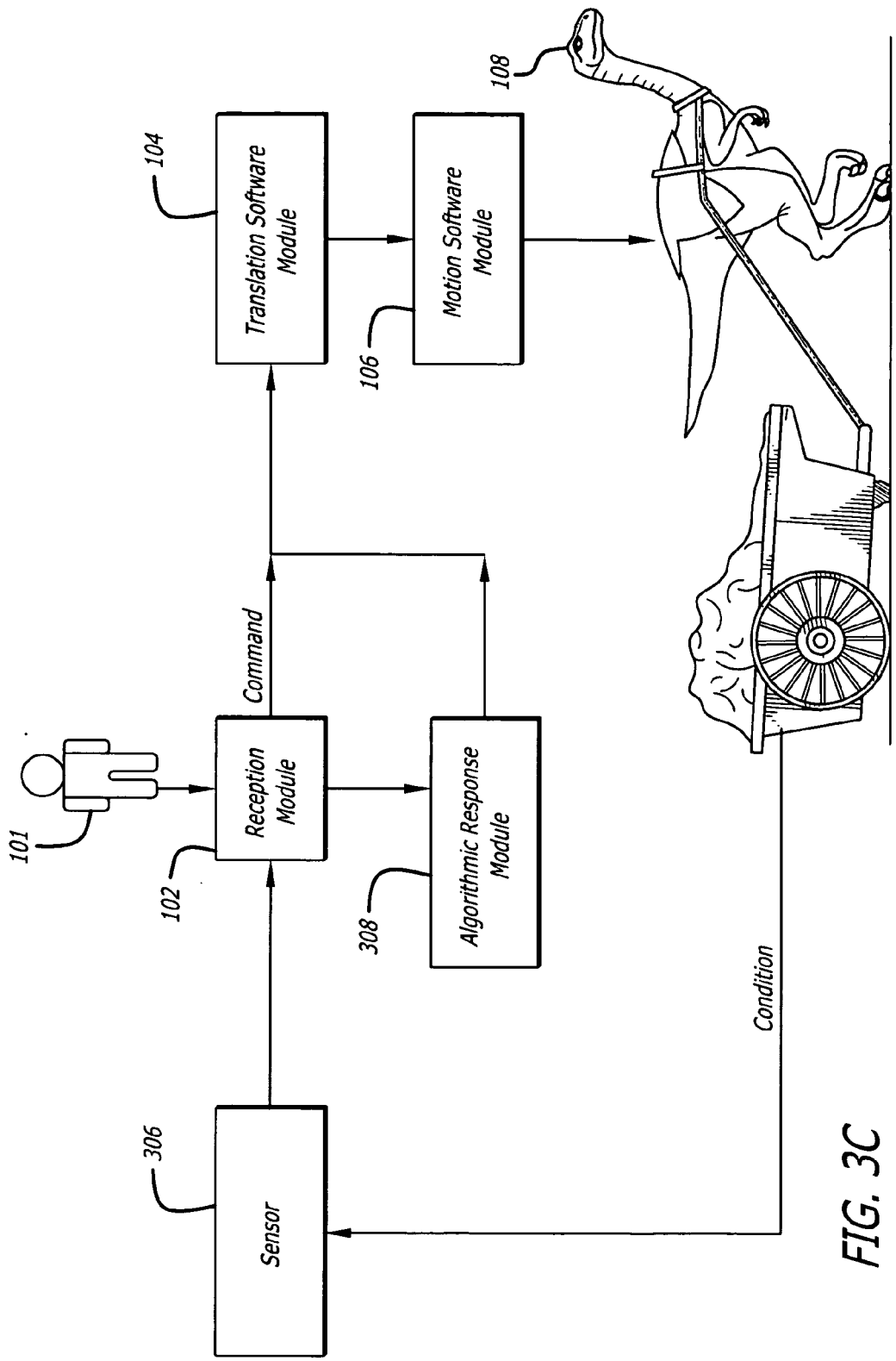
FIG. 3C illustrates another embodiment of the algorithmic configuration in which reception module receives the sensed condition from the sensor and receives the user-inputted motion from the operator.

FIG. 3C illustrates another embodiment of the algorithmic configuration 300 in which reception module 102 receives the sensed condition from the sensor 306 and receives the user-inputted motion from the operator 101. The reception module 102 determines the type of instruction that is received and distributes the instruction to an appropriate module. For instance, when the reception module 102 receives a user-inputted instruction, the reception module 102 distributes the user-inputted instruction to the translation software module 104. If the reception module 102 receives a sensed condition, the reception module 102 provides the sensed condition to the algorithmic response module 308. The algorithmic response module computes at least one motion that is sent to the translation software module 104. In one embodiment, the motion software module 106 also performs the functions of the translation software module 104 and/or the algorithmic response module 308. Therefore, the reception module 102 can send all the instructions to one module.

FIG. 4 illustrates a process 400 that combines a user-inputted instruction with an algorithmically determined instruction. At a process block 402, a user-inputted instruction is received. In one embodiment, the user-inputted instruction is received form the operator 101 at the reception module 102. A stimulus is received at the sensor 306 at a process block 404. The stimulus can be any one of the environmental conditions. At a process block 406, the stimulus is provided as an input to an algorithm. In one embodiment, the stimulus is provided to the algorithmic response module 308. At a process block 408, the algorithm is performed to determine algorithmic movement of the animatronic figure 108. In one embodiment, the algorithmic response module 308 runs the algorithm to determine the algorithmic movement. At a process block 410, the user-inputted motion is combined with the algorithmically determined motion. In one embodiment, the motion software module 106 performs this combination. The composite motion resulting from the combination provides the animatronic figure 108 with a coordinated life-like motion.

Figure 5:
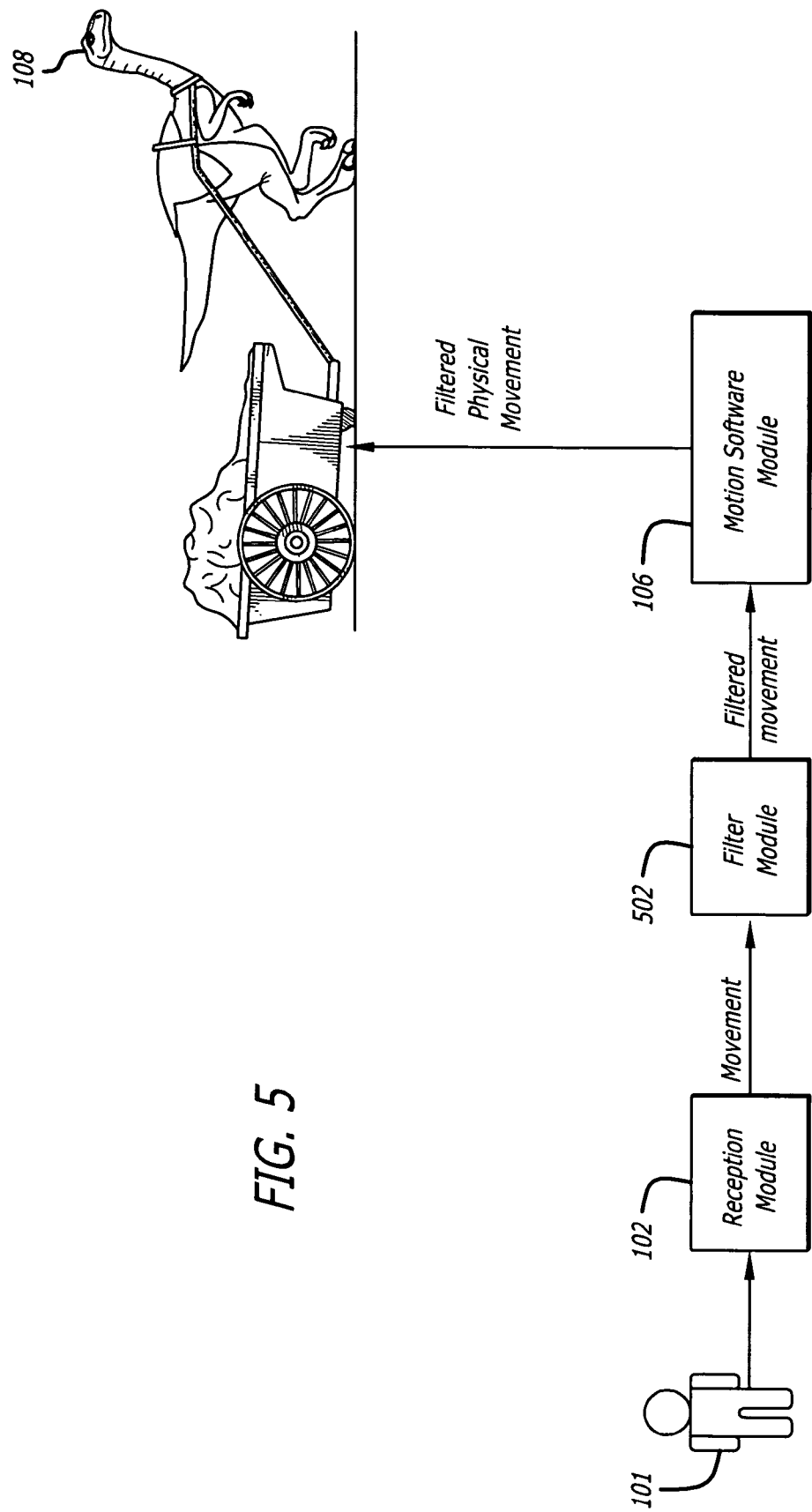
FIG. 5 illustrates a filtering animatronic configuration in which movements produced by the animatronic figure are filtered.

FIG. 5 illustrates a filtering animatronic configuration in which movements produced by the animatronic figure 108 are filtered. In one embodiment, the user 101 provides a user-inputted motion to the reception module 102. The reception module 102 provides the user-inputted motion to a filter module 502. The filter module 502 can receive motions or motion instructions that are not necessarily user-inputted. The filter module 502 passes the filtered movement commands to the motion software module 106, which produces physical movement commands for the animatronic figure 108. One skilled in the art will recognize that in a simplified embodiment the filter module 502 could connect directly to the animatronic figure 108.

A motion of the animatronic figure 108 has an associated frequency content. Accordingly, a single figure motion of the animatronic figure 108 can have an associated frequency content. If the motion of the animatronic figure 108 changes quickly, then at least a portion of the frequency content includes a high frequency. If the motion of the animatronic figure 108 changes slowly, then at least a portion of the frequency content includes a low frequency.

The filter module 502 filters the user-inputted motion according to one of a variety of filters. For instance, the filter module 502 can filter the user-inputted motion according to a low-pass filter, which blocks high frequency content and passes the lower frequency content. The filter module 502 can also filter the user-inputted motion according to a high-pass filter, which blocks low frequency content and passes the higher frequency content. Further, the filter module 502 can filter the user-inputted motion according to a band-pass filter, which passes a limited range of frequencies. The band-pass filter can be a combination of a low-pass filter and a high-pass filter to only pass through certain low frequency content and certain high frequency content. One of ordinary skill in the art will recognize that other filters can be used by the filter module 502.

In essence, the filter module 502 filters motions to appear more life-like. For instance, when the user 101 inputs an instruction to move the head of the animatronic figure 108 in a particular direction, the head may normally move so as to reflect both the gross low-frequency turning motion as well as any high frequency jerking or stuttering motion the operator inadvertently added. The filter module 502 filters the motion of the head so that high frequency content is blocked and low frequency content is passed through. Therefore, the head of the animatronic figure 108 will move in a relatively smooth motion. The head of the animatronic figure 108 can still move through the entire range of motion, but will do so more smoothly.

The filtering of the motions of the animatronic figure 108 produces motions that are life-like. Real world motions produced by living creatures occur at different frequencies than others. For instance, most living creatures move their eyes more quickly than their heads.

Figure 6A:
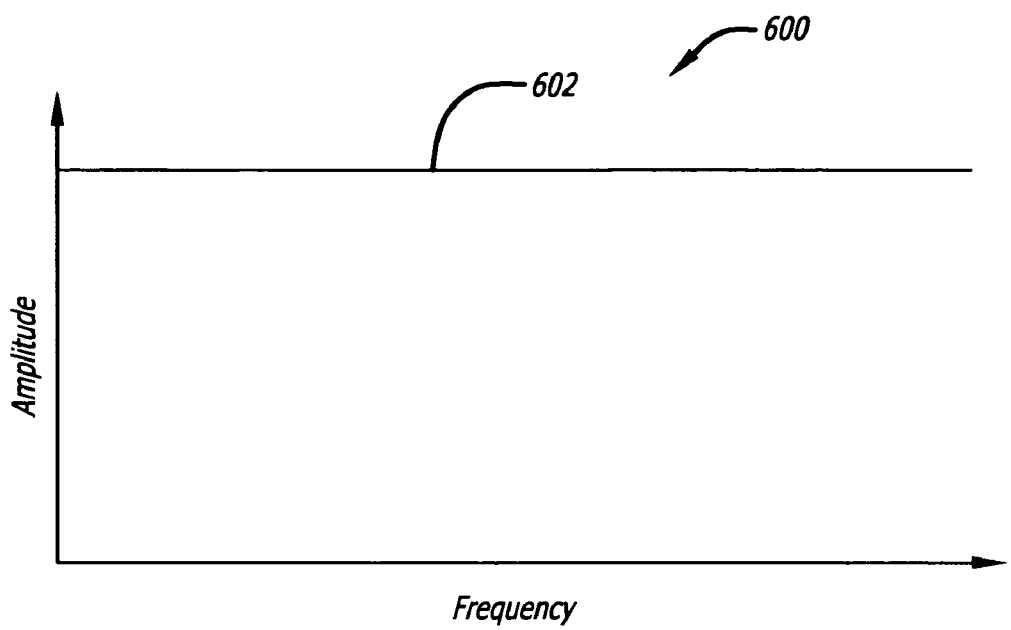
FIG. 6A illustrates a graph for unfiltered motion of the head of the animatronic figure.

FIG. 6A illustrates a graph 600 of the filter for unfiltered motion of the head of the animatronic figure 108. The unfiltered motion appears as a horizontal bar 602 that has a constant amplitude at different portions of the frequency content. The horizontal bar 602 represents the motion of the animatronic figure 108, approximately tracking the input of the user 101. For instance, if the user 101 moves a joystick quickly from left to right, the head of the animatronic figure 108 will move at a movement close to that of the joystick movement.

Figure 6B:
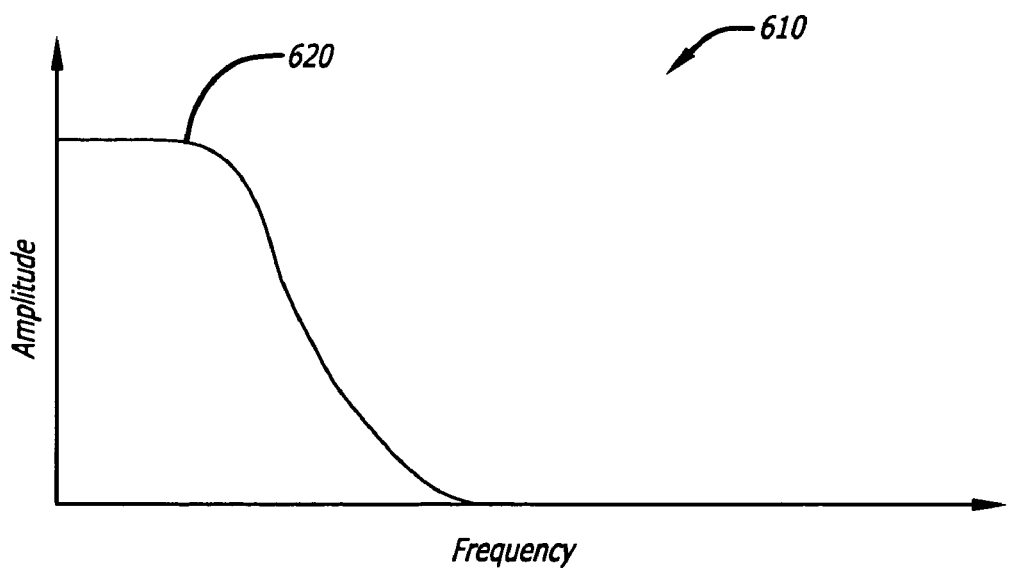
FIG. 6B illustrates a graph for filtered motion of the head of the animatronic figure.

FIG. 6B illustrates a graph 610 of the filter for filtered motion of the head of the animatronic figure 108. The portion of the higher frequency content is filtered so that only the lower frequency content passes through. A curve 620 is produced from filtering the horizontal bar 602. As illustrated in the graph 610, the curve 620 has the amplitude in the lower frequency portion that the animatronic figure 108 would produce if filtering did not take place at all. However, the amplitude decreases in the higher frequency portions.

Because of the low-pass filter, the head of the animatronic figure 108 moves without any high frequency jerking or stuttering inadvertently provided by the user 101. The resulting motion provides a life-like motion like the head of a living creature.

Figure 7:
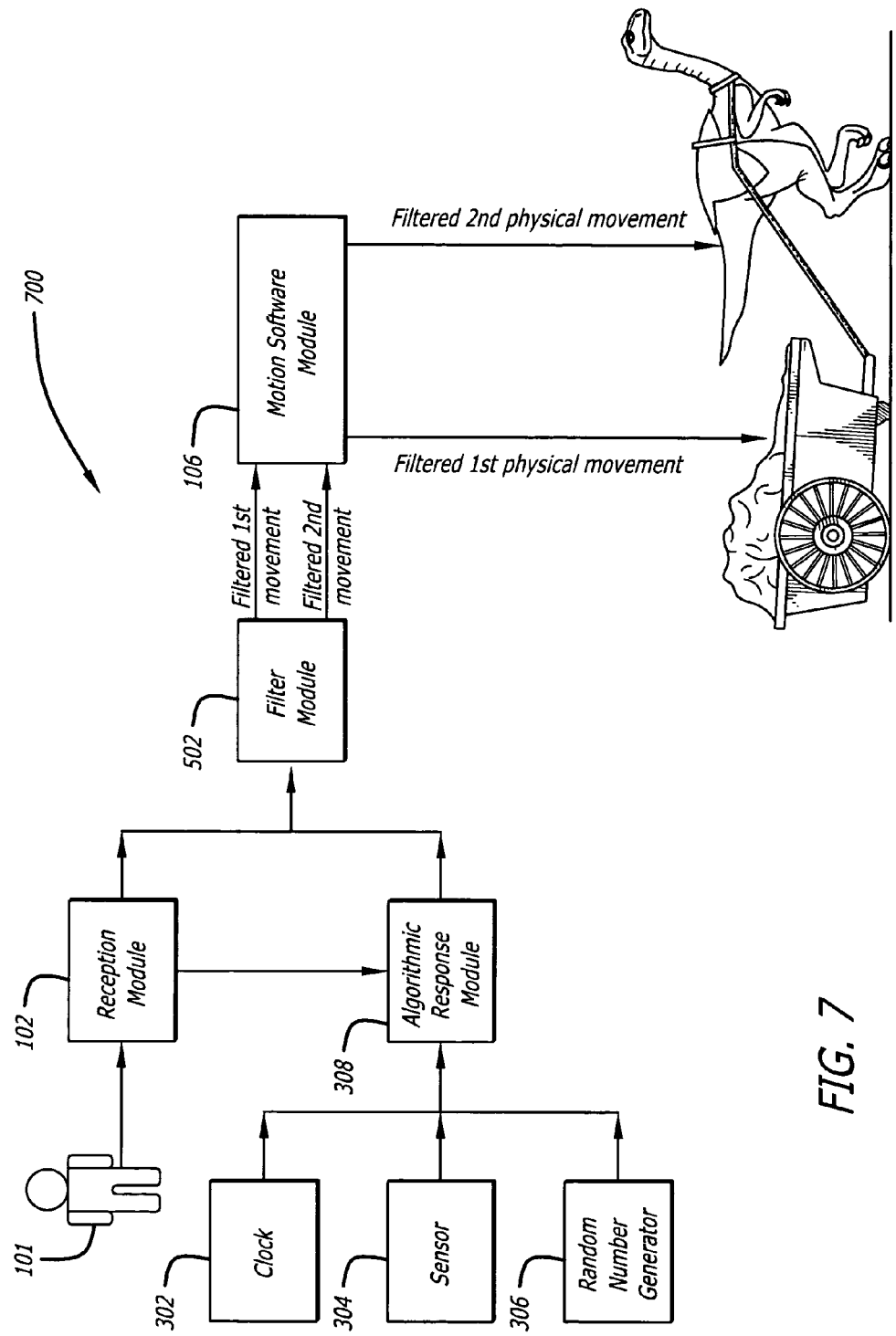
FIG. 7 illustrates an animatronic filter configuration, which filters user-inputted motions and algorithmically determined motions in a coordinated manner to produce life-like motions for the animatronic figure.

FIG. 7 illustrates an animatronic filter configuration 700, which filters user-inputted motions and algorithmically determined motions in a coordinated manner to produce life-like motions for the animatronic figure 108. In one embodiment, a filter module 502 receives a user-inputted instruction from the reception module 102, which receives the user-inputted instruction from the user 101. The algorithmic response module 308 receives a condition from the clock 302, the random number generator 304, and/or the sensor 306. The algorithmic response module 308 utilizes the condition to algorithmically calculate an algorithmically determined motion. Further, the algorithmic response module 308 provides the algorithmically determined motion to the filter module 502.

The filter module 502 applies a first filter to the user-inputted motion and applies a second filter to the algorithmically-determined motion in an attempt to coordinate movements of the animatronic figure 108. For instance, a living creature would likely move its eyes in a direction that its head is going to move prior to the head's movement, referred to as an anticipation motion. The filter module 502 can apply a band-pass filter or a high pass filter to the eyes of the animatronic figure 108 to produce this quick anticipatory motion of the eyes. Further, the filter module 502 can apply a low pass filter to the head to produce a relatively slow smooth motion of the head. The filter module 502 then provides the filtered motion of the eyes and the filtered motion of the head to the motion software module 106. The motion software module 106 instructs the animatronic figure 108 to produce the filtered motions.

Figure 8A:
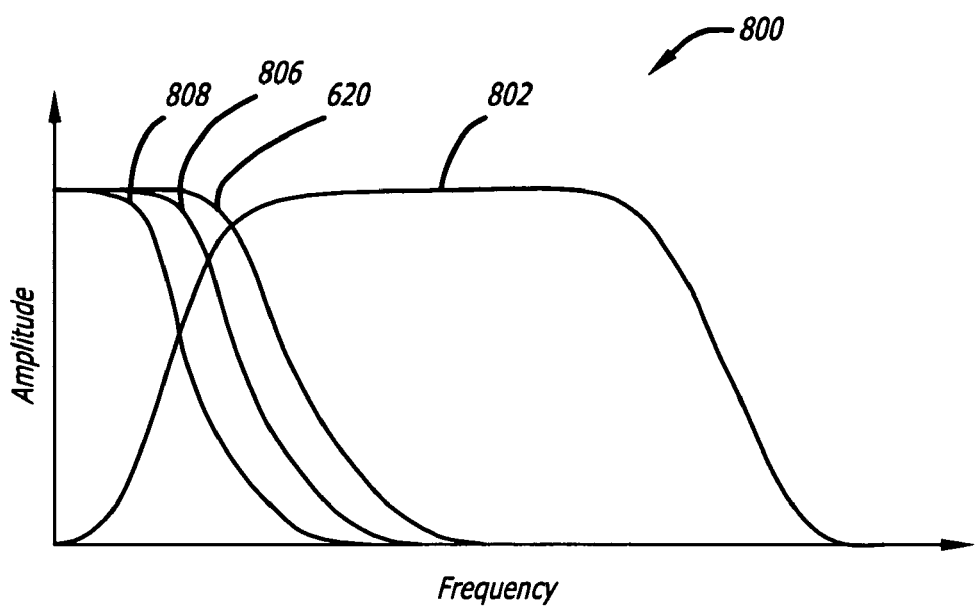
FIG. 8A illustrates a graph depicting filters for an animatronic figure.

FIG. 8A illustrates a graph 800 depicting the filters for the different motions of the animatronic figure 108. A curve 802 represents the filter for the motion of the eyes of the animatronic figure 108. In one embodiment, the filter module 502 applies a band-pass filter to the motion of the eyes of the animatronic figure 108. As can be seen from the curve 802, a portion of high frequency content and a portion of low frequency content are blocked. As a result, the remaining mid-frequency content is passed through.

Further, the curve 620 is illustrated to represent operation of the low-pass filter for the head of the animatronic figure 108. In one embodiment, a low-pass filter is applied to the motion of the head of the animatronic figure 108. The low-pass filter blocks the high frequency content and passes through the low frequency content. Therefore, the head of the animatronic figure 108 moves in a relatively slow smooth motion compared with the eyes of the animatronic figure 108. As a result, the eyes move first in the direction that the head is about to move to produce a coordinated life-like motion in the animatronic figure 108.

In addition, a filter is applied to the motion of the middle portion of the neck of the animatronic figure 108. In one embodiment, the filter is a slightly lower low-pass filter. A curve 806 represents the low-pass filter of the middle portion of the neck. The low-pass filter blocks out a greater portion of the high frequency content on the middle portion of the neck than is blocked out on the head. Accordingly, the head moves a little before and a little more quickly than the middle portion of the neck to coordinate the head and neck motion in a life-like manner.

A filter is also applied to the motion of the base of the neck of the animatronic figure 108. In one embodiment, the filter is an even slightly lower low-pass filter. A curve 808 represents the low-pass filter of the base of the neck. The low-pass filter blocks out a greater portion of the high frequency content on the base of the neck than is blocked out on the middle portion of the neck. Accordingly, the middle portion of the neck moves a little before and a little more quickly than the base of the neck to coordinate the head and neck in a life-like manner.

Figure 8B:
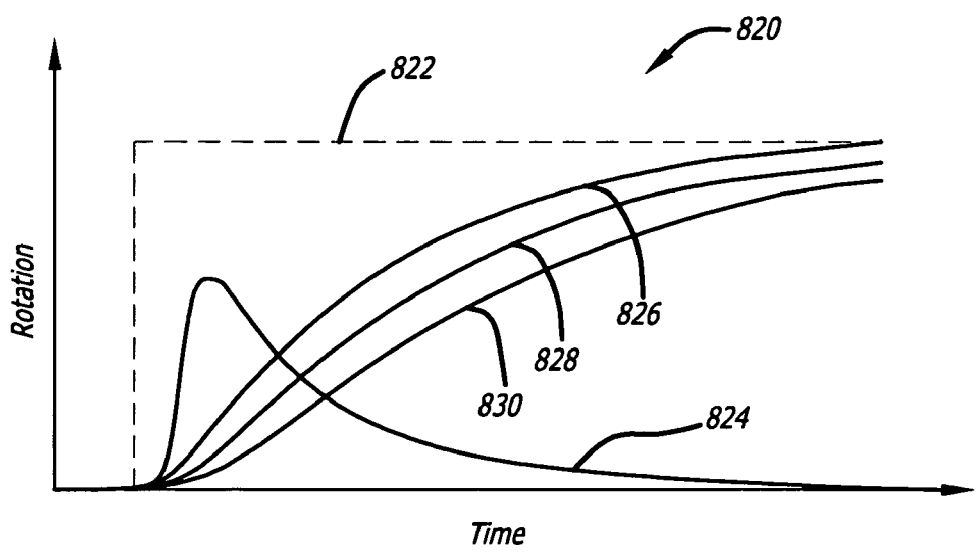
FIG. 8B illustrates a graph that represents the rotation of body parts of the animatronic figure that were filtered by the filter module.

FIG. 8B illustrates a graph 820 that represents the resulting rotational motion of the body parts of the animatronic figure 108 that were filtered by the filter module 502 using the filters shown in FIG. 8A. The step input 822 represents an idealized extreme unfiltered motion that is inputted by the user 101. A curve 824 represents the filtered eye motion. Further, a curve 826 represents the filtered head motion, a curve 828 represents the filtered mid-neck motion, and a curve 830 represents the base of the neck motion. The curve 824 has a very quick jump in rotation because the eyes quickly move in the direction that the other body parts will eventually move. Accordingly, the head, mid-neck, and base of the neck move more slowly.

FIG. 9A illustrates a process 900 for filtering motions of the animatronic figure 108 based on a user-inputted command and a command determined by the occurrence of the user-inputted command. At a process block 902, a first command is received from an operator 101. At a process block 902, a second command is determined based on the occurrence of the first command being received. In one embodiment, the algorithmic response module 308 algorithmically determines a movement based upon the occurrence of a condition. For instance, the algorithmic response module 308 can provide a command for the animatronic figure 108 to move the eyes of the animatronic figure 108 upon the occurrence of the user 101 providing a command to move the head of the animatronic figure 108. In one embodiment, the eyes move in the direction of the user-inputted motion.

At a process block 906, a first movement and a second movement are determined. The movements are determined from the respective commands. In one embodiment, the translation software module 104 translates the commands into the movements.

At a process block 908, the first movement and the second movement are filtered to produce a coordinated life-like motion. Accordingly, at a process block 910, the first and second movements are provided to the animatronic figure 108.

FIG. 9B illustrates a process 920 for filtering motions of the animatronic figure 108 based on a user-inputted command and a command that is determined from a stimulus. At a process block 922, a first command is received from an operator 101. Accordingly, a stimulus is received from the sensor 306 at the process block 924. At a process block 926, a second command is determined based on receiving a stimulus. In one embodiment, the algorithmic response module 308 algorithmically determines a movement based upon the occurrence of a stimulus. For instance, the algorithmic response module 308 can provide a command for the animatronic to move its chest in a breathing motion according to a time on the clock 302.

At a process block 928, a first movement and a second movement are determined. The movements are determined from the respective commands. In one embodiment, the translation software module 104 translates the commands into the movements.

At a process block 930, the first movement and the second movement are filtered to produce a coordinated life-like motion. Accordingly, at a process block 932, the first and second movements are provided to the animatronic figure 108.

In one embodiment, a real-time evaluated scripting language is used to describe show elements. Show elements are theatric elements that can range from small motions and gestures up to complex interactive motions such as walking. These show elements contain sets of motions for the animatronic figure 108 as well as audio and other computer controlled events such as lighting and video. Show elements are typically built up, using the scripting language, by combining simpler component show elements to produce complex life-like motions.

In one embodiment, the scripting language and its execution environment are specialized for physical animation and run in a strictly real-time framework. The specialization for physical animation makes common animation tasks simple and efficient. The real-time framework assures that the resulting motions do not stutter or pause, maintaining consistent control and safety.

Smooth motion is helpful for physically realized animation. The underlying system maintains an explicit understanding of the component, composite, and transformed motion allowing automatic generation of smooth trajectories. In one embodiment, an approach to keyframe animation is used that is both simple to use and maintains $C^2$ continuity. By $C^2$ continuity, it is meant that the trajectory and its first two derivatives are continuous. Not only does this assure that the animatronic figure 108 does not attempt to jump discontinuously from one location to another, but that the velocities and accelerations are bounded and smooth. The velocities and accelerations being bounded and smooth eventually leads to the motor torques also being bounded and smooth. Maintaining this information allows component motions to be projected through certain generalized transforms, making it possible to create smooth trajectories simultaneously described in a combination of transform spaces.

FIG. 10 illustrates a layered system 1000 of software modules. In one embodiment, the layered system 1000 controls the animatronic figure 108. An operator interface 1002 allows the operator 101 to control the system. Further, a trajectory planner 1004 decides the path that the motors of the animatronic figure 108 should take. In addition, a servo loop 1006 directs the motors and other actuators to perform the desired motions. The servo loop 1006 also monitors the motors and other actuators to make sure that the motors and other actuators are performing within specified limits. A plurality of low-level hardware drivers 1008 communicate directly with hardware 1010 of the animatronic figure 108.

Figure 11:
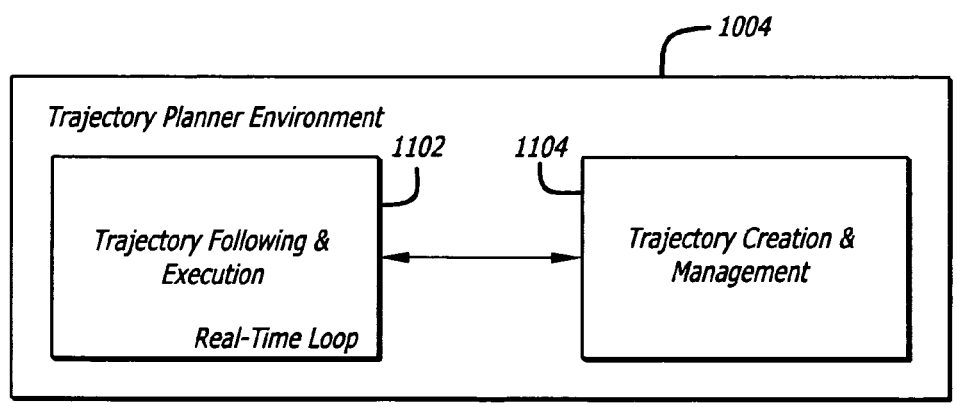
FIG. 11 illustrates a detailed view of the trajectory planner.

FIG. 11 illustrates a detailed view of the trajectory planner 1004. The trajectory planner 1004 plans and implements motions of the animatronic figure 108. The script elements mentioned above are implemented by directing the actuators of the animatronic figure 108 to follow specific trajectories. These trajectories are not necessarily fixed or pre-determined, but typically, change based on external inputs and operator control. This allows spontaneous interaction with guests, responses to the environment, and triggered script elements. In one embodiment, continuously evolving trajectories are produced in a timely manner and are smooth.

In one embodiment, trajectories are implemented as computing objects, effectively computer programs, which are evaluated on a precise real-time clock. They are created, installed, and then run until the resulting motion completes or is stopped. While a trajectory is running, it is continually being evaluated to determine the animatronic figure's next target positions.

Trajectories are evaluated on a strictly periodic cycle. It is not acceptable for the evaluation to pause or not return a value in its allotted time. Such a pause would be indistinguishable from a system failure, and not returning a value after the allotted time would result in motion that is not smooth. Therefore, elements of the computation that could cause the calculation to falter are necessarily moved elsewhere.

Evaluated languages achieve their dynamic behavior by acquiring and releasing resources as they are needed to perform a calculation. The most common resource is computer memory, but also includes hardware and other devices. Acquiring resources can take an undetermined amount of time. Thus, the standard approach used by scripting languages to perform calculations cannot assure timely results and is therefore not acceptable here.

The trajectory planner 1004 has a trajectory following and execution module 1102. Accordingly, the trajectory following and execution module 1102 handles the real-time task of evaluating trajectories and determining target positions. The trajectory following and execution module 1102 periodically wakes up, evaluates the active trajectories, and returns target positions.

In addition, the trajectory planner 1004 has a trajectory creation and management module 1104. Accordingly, the trajectory creation and management module 1104 handles all the non-real time needs, particularly the creation of trajectory objects and managing of resources. When a trajectory completes, it and all its resources are handed back to the manager to be cleaned up, that is memory and devices are freed back to the computer to be used elsewhere. This approach of having a non real-time management thread, cooperating program that shares and manages a common memory space, is different and more powerful than typically used elsewhere for resource management.

Trajectory objects can be atomic or composite. An atomic trajectory is capable of computing targets position independent of other trajectories. In one embodiment, the atomic trajectory uses time or external inputs. A composite trajectory computes its target positions based on the outputs of component trajectories.

Figures 12, 17:
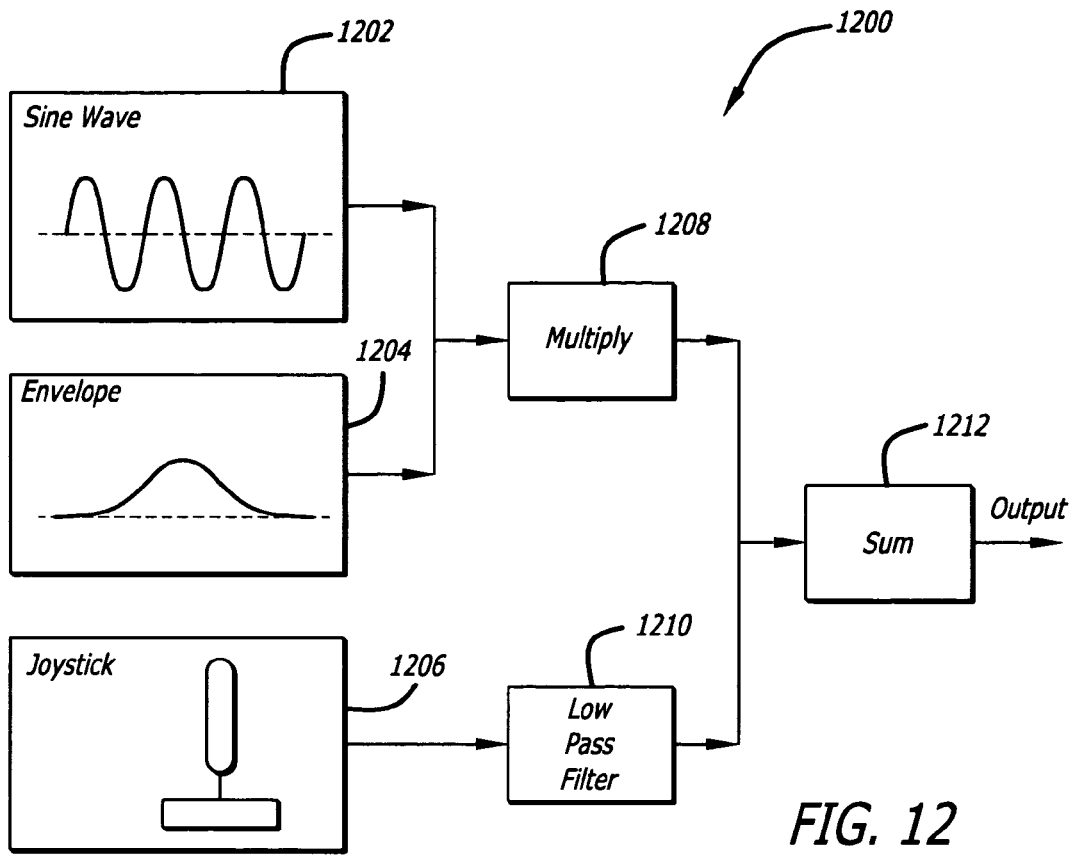
FIG. 12 shows an example of a simple composite trajectory.
FIG. 17 is an example script for the simple four point keyframe trajectory shown in FIG. 15 used to describe smooth keyframes.

FIG. 12 shows an example of a simple composite trajectory 1200. The atomic sine wave 1202 and envelope trajectories 1204 are multiplied and then the atomic joystick input 1206 is filtered and then added in. This composite trajectory object outputs its result as a single value, the next target position.

The trajectory objects in this embodiment provide a generalized computing environment. The example in FIG. 12 shows the use of math operators such as multiply 1208 and sum 1212, basic functions such as the atomic sine wave 1202, keyframed data such as the envelope trajectories 1204, and a filter 1210.

In addition, other trajectories can include sequence, composite, and transition trajectories, perform logical operators, and handle starting, stopping, and interrupting trajectories. Trajectories can produce multiple outputs, be transformed, loop, and be tested. Finally, trajectories can define an internal computational environment where internal variables, functions, and trajectories can be defined.

Keyframes based curves are a common and important tool for animation, computer aided design, and elsewhere. Standard approaches used for keyframe animation are powerful and simple to use but lack the high degree of mathematical smoothness required by physical animation, that is the lifelike motion of an animatronic figure or robot. In one embodiment, an atomic keyframe trajectory that is used is $C^2$ continuous. By the term $C^2$ continuous, it is meant that the positions as well as the first two derivatives, the velocity and acceleration, are continuous and smooth.

In one embodiment, smooth keyframe based curves are implemented. Accordingly, the curve is $C^2$ continuous. Further, data is interpolated, i.e. the curve passes through, not just approximates, all specified data. In addition, keyframes may be non-uniformly spaced. In other words, the time between adjacent pairs of keyframes may be different. Individual keyframes may contain position data alone, position and velocity data, or position, velocity, and acceleration data, all of which is interpolated. Different kinds of keyframes, such as position, position/velocity, or position/velocity/acceleration, may be arbitrarily mixed.

Standard approaches to keyframe animation often use Bézier curves or the generalized class of Hermite splines, both of which in their standard form are only $C^1$ continuous. Higher order Bézier and Hermite splines exist but are not well suited to simple curve editing. The most common Hermite spline for curve editing is the Catmull-Rom method that uses adjacent points to compute the additional needed constraints, i.e., the velocities, at each point. Additional controls can also be added, probably the most common example being Kochanek-Bartels splines, as seen in AUTODESK's 3D-STUDIO MAX and NEWTEK's LIGHTWAVE.

Figure 13:
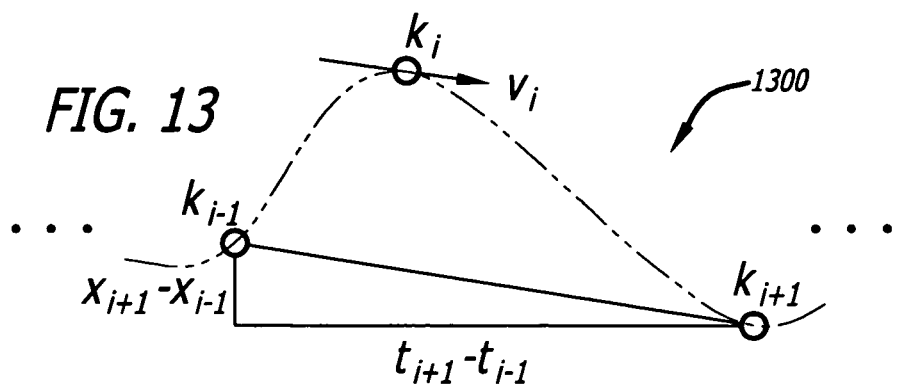
FIG. 13 illustrates a curve described by a plurality of keyframes.

FIG. 13 illustrates a curve 1300 described by a plurality of keyframes. In one embodiment, the curve is described by a set of N keyframes$_{k1, k2, \ldots kn}$. Each keyframe $k_i$ contains a time and a position $\{t_i, x_i\}$, and may optionally also contain a velocity $\{t_i, x_i, v_i\}$, or a velocity and an acceleration $\{t_i, x_i, v_i, a_i\}$. For any keyframe that does not have a velocity specified, the keyframe is computed in the following manner. If it is the first or the last keyframe ($k_1$ or $k_N$), the unspecified velocity is set to zero, $v_i=0$. Otherwise, the velocity is computed using the position of the adjacent keyframes in a manner similar to what is used in Catmull-Rom. Catmull-Rom computes velocity by simply drawing a line through the neighboring points:

$$v_i = \frac{x_{i+1} - x_{i-1}}{t_{i+1} - t_{i-1}}$$

as illustrated in FIG. 13. Catmull-Rom can perform poorly if the times between keyframes are not fairly equal, sometime requiring curves with high accelerations.

Figure 14:
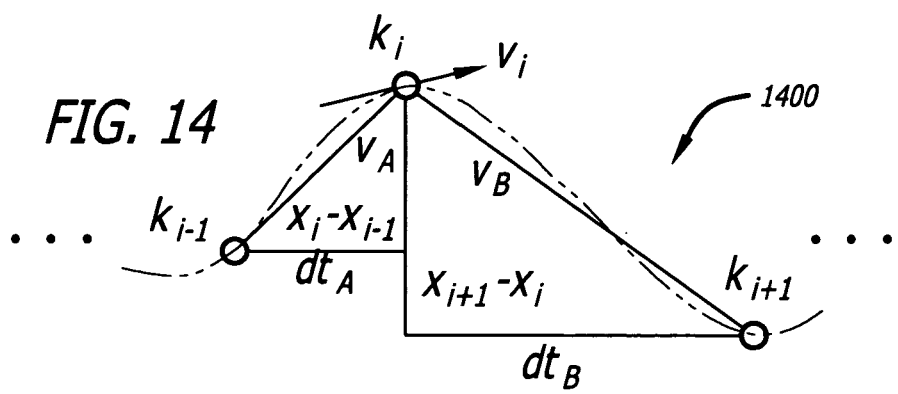
FIG. 14 illustrates another embodiment in which a curve described by a plurality of keyframes.

FIG. 14 illustrates another embodiment in which a curve 1400 described by a plurality of keyframes. A weighted average of two adjacent velocities is implemented. The following equations describe this weighted average:
where $$v_i = \frac{v_A dt_B + v_B dt_A}{dt_A + dt_B}$$

$$dt_B = t_{i+1} - t_i$$

$$v_A = \frac{x_i - x_{i-1}}{t_i - t_{i-1}}$$

$$v_B = \frac{x_{i+1} - x_i}{t_{i+1} - t_i}$$

The value for $v_i$ reduces to the Catmull-Rom value when $dt_A=dt_B$. For any keyframe that does not have an acceleration specified, the following computation is performed. If it is the first or last keyframe ($k_1$ or $k_N$), the unspecified acceleration is set to zero, $a_i=0$. If the acceleration of a remaining keyframe is unspecified, compute it by averaging the accelerations of the curve to the left of the keyframe and the curve to the right of the keyframe, such that those curves interpolate whatever data does exist. The equation $$a_i = \frac{a_A + a_B}{2}$$

represents this computation. The component accelerations $a_A$ and $a_B$ are computed in the following manner. If the previous keyframe $k_{i-1}$ has a specified acceleration or is the first keyframe (so $a_{i-1}=a_1=0$), then solve the fourth-order polynomial $f_a(t)=a_0+a_1t+a_2t^2+a_3t^3+a_4t^4$ such that it passes through $\{t_{i-1}, x_{i-1}, v_{i-1}, a_{i-1}\}$ and $\{t_i, x_i, v_i\}$ and then compute the resulting acceleration at $t_i$:

$$a_A = f_A''(t_i) = \frac{12(x_{i-1} - x_i) + dt_A(6(v_{i-1} + v_i) + dt_A a_{i-1})}{dt_A^2}$$

Else, the previous keyframe $k_{i-1}$ does not have a specified acceleration and is not the first keyframe. Solve the third-order polynomial $f_a(t)=a_0+a_1t+a_2t^2+a_3t^3$ such that it passes through $\{t_{i-1}, x_{i-1}, v_{i-1}\}$ and $\{t_i, x_i, v_i\}$ and then compute the resulting acceleration at $t_i$:

$$a_A = f_A''(t_i) = \frac{6(x_{i-1} - x_i) + 2dt_A(v_{i-1} - 2v_i)}{dt_A^2}$$

If the subsequent keyframe $k_{i+1}$ has a specified acceleration or is the last keyframe (so $a_{i+1}=a_N=0$), then solve the fourth-order polynomial $f_b(t)=b_0+b_1t+b_2t^2+b_3t^3+b_4t^4$ such that it passes through $\{t_i, x_i, v_i\}$ and $\{t_{i+1}, x_{i+1}, v_{i+1}, a_{i+1}\}$ and then compute the resulting acceleration at $t_i$:

$$a_B = f_B''(t_i) = \frac{12(x_{i+1} - x_i) + dt_B(-6(v_{i+1} + v_i) + dt_B a_{i+1})}{dt_B^2}$$

Else, the subsequent keyframe $k_{i+1}$ does not have a specified acceleration and is not the last keyframe. Solve the third-order polynomial $f_b(t) = b_0 + b_1 t + b_2 t^2 + b_3 t^3$ such that it passes through $\{t_i, x_i, v_i\}$ and $\{t_{i+1}, x_{i+1}, v_{i+1}\}$ and then compute the resulting acceleration at $t_i$:

$$a_B = f_B''(t_i) = \frac{6(x_{i+1} - x_i) - 2dt_B(v_{i+1} + 2v_i)}{dt_A^2}$$

At this point, each keyframe has a position, velocity, and acceleration, either from being specified or from being computed based on the values of adjacent keyframes. These fully populated keyframes $\{t_i, x_i, v_i, a_i\}$ are now used to compute the resulting curve.

Figure 15:
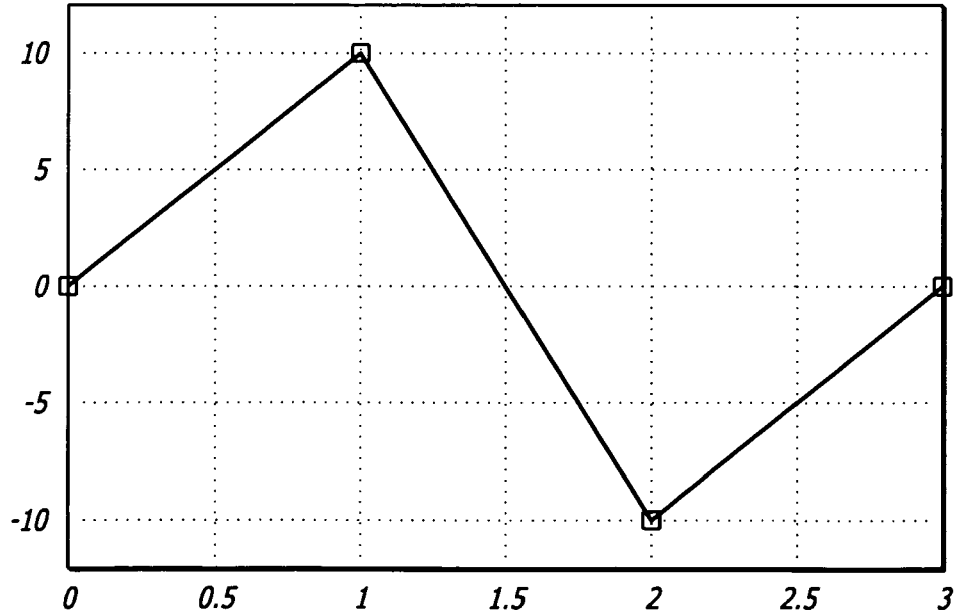
FIG. 15 illustrates a graph with a sequence of points.

FIG. 15 illustrates a graph 1500 with a sequence of keyframes. All four of the keyframes specify position only, but the first and last default to having zero velocity and acceleration. Between pairs of keyframes $k_i$: and $k_{i+1}$ the curve is defined to be the value of the fifth-order polynomial $f(\tau) = c_0 + c_1\tau + c_2\tau^2 + c_3\tau^3 + c_4\tau^4 + c_5\tau^5$ that passes through $\{t_i, x_i, v_i, a_i\}$ and $\{t_{i+1}, x_{i+1}, v_{i+1}, a_{i+1}\}$, where $$t = t - t_i$$
$$dt = t_{i+1} - t_i$$
$$a_0 = x_i$$
$$a_1 = v_i$$
$$a_2 = a_i$$
$$c_3 = \frac{20(x_{i+1} - x_i) - dt(8v_{i+1} + 12v_i) + dt^2(a_{i+1} - 3a_i)}{2dt^3}$$
$$c_4 = \frac{30(x_i - x_{i+1}) + dt(16v_i + 14v_{i+1}) + dt^2(3a_i - 2a_{i+1})}{2dt^4}$$
$$c_5 = \frac{12(x_{i+1} - x_i) - 6dt(v_{i+1} + v_i) + dt^2(a_{i+1} - a_i)}{2dt^5}$$

Figure 16A:
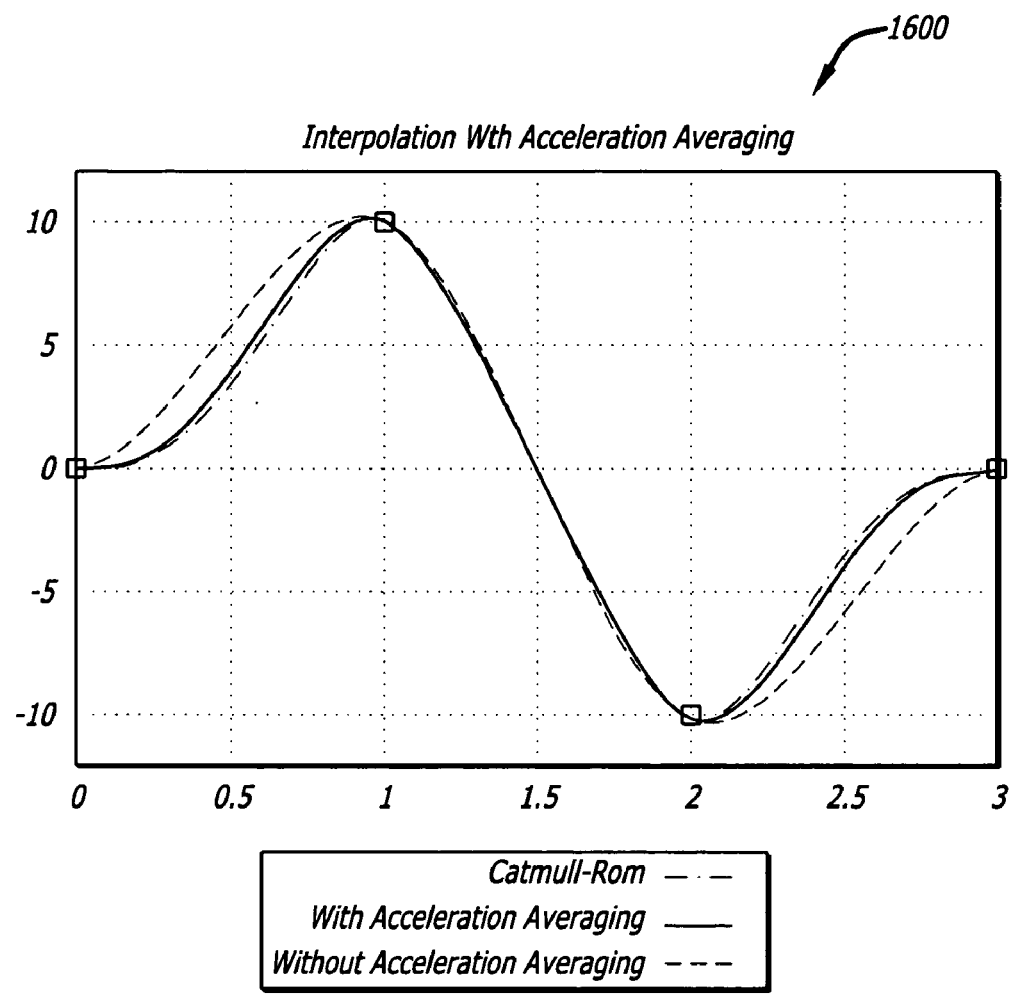
FIG. 16A illustrates another graph with an interpolation of data.

FIG. 16A illustrates another graph 1600 with an interpolation of data. The graph 1600 shows the standard Catmull-Rom keyframe spline as well as the smooth keyframe, both with and without the acceleration smoothing.

Figure 16B:
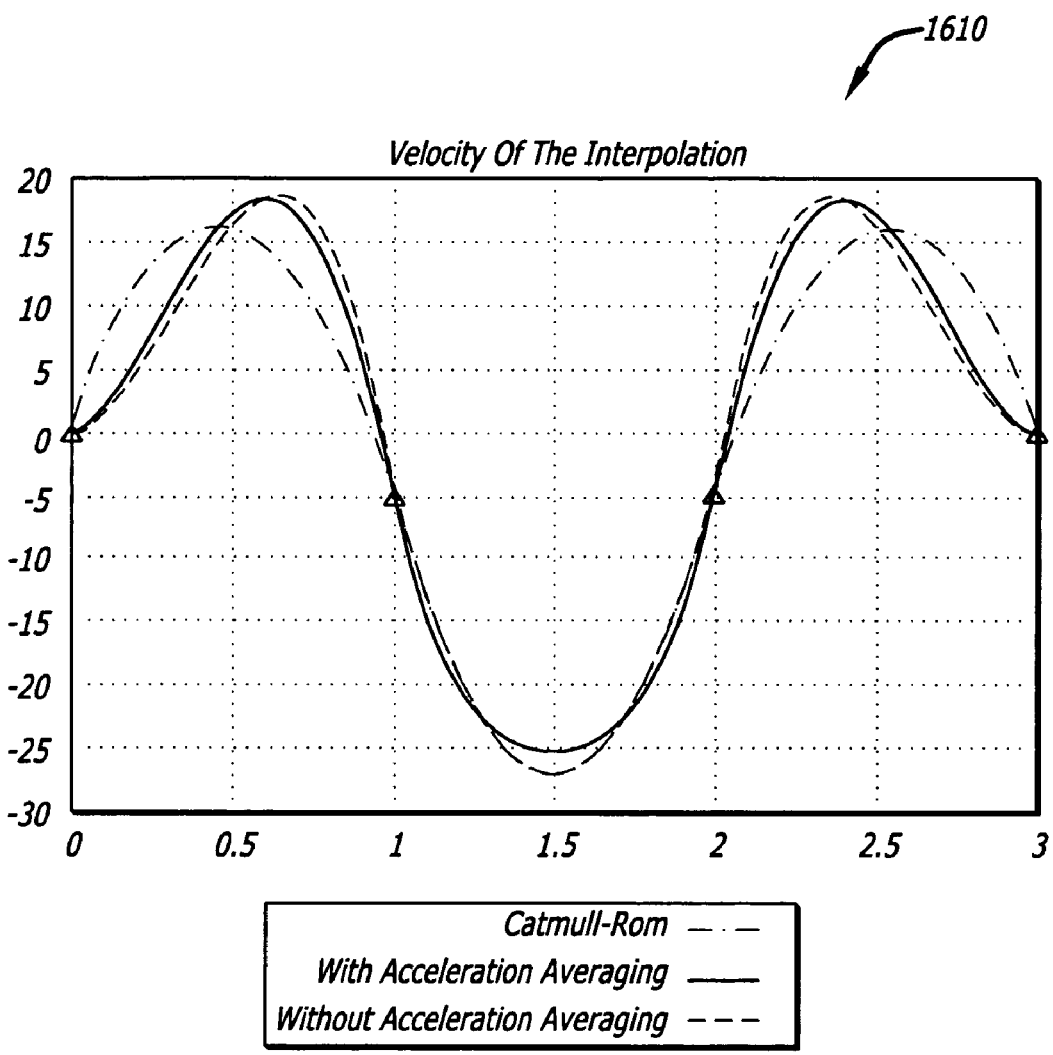
FIG. 16B shows the corresponding velocities of the graph depicted in FIG. 16A.
Figure 16C:
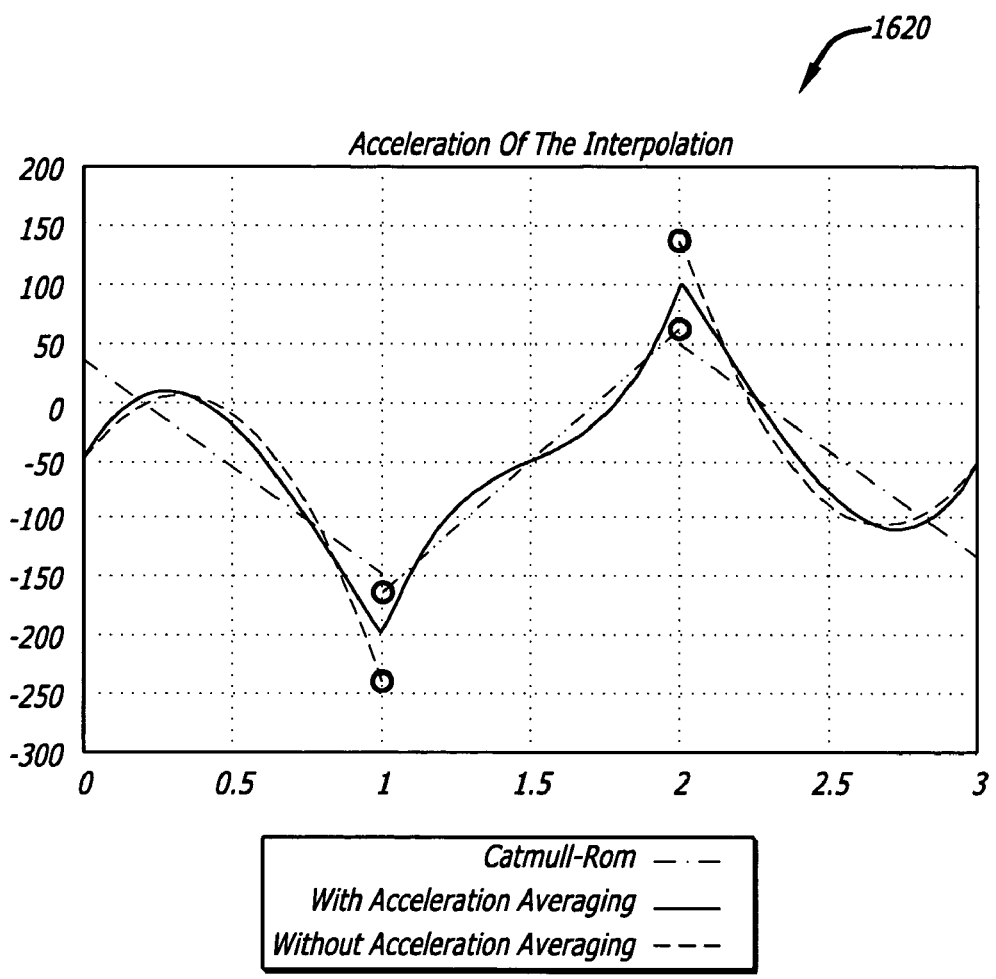
FIG. 16C shows the corresponding accelerations of the graph depicted in FIG. 16A.

FIG. 16B shows the corresponding velocities of the graph 1610. FIG. 16C shows the corresponding accelerations of the graph 1620. Further, there are discontinuities in acceleration of the Catmull-Rom spline at the keyframe points at times t=1 and t=2.

An added benefit of this approach is that the acceleration averaging typically reduces the maximum acceleration, and thereby eventual torque required by the robot to realize the motion.

Not only should atomic and composite trajectory objects produce smooth motions, but transitions between curves, curves that are interrupted, and curves that start from unanticipated positions must do so as well. This is done by computing and passing software objects, called PVA objects (for position, velocity, and acceleration) that describe the trajectory's current motion. Trajectory objects use PVAs to initialize their motion and return them when they stop or are interrupted. Additionally, it was found that PVA objects can be used to produce trajectories that combine motions in different transform or description spaces.

Transitions between smooth component trajectories are achieved using cross fades, where the fade is itself a $C^2$ continuous curve. Any $C^2$ continuous s-shaped curve could be used, here this was done with the $5^{th}$ order polynomial $$f(\tau) = 3\tau(10 + \tau(6\tau - 15))$$

where the scaled time $\tau$ is in $0 \leq \tau \leq 1$. If the two trajectories $T_1$ and $T_2$ as well as the transition function $f(t)$ are $C^2$ continuous, then their linear combination $$f(\alpha t)T_1 + (1 - f(\alpha t))T_2$$

where $\alpha$ is a constant scaling factor for time, is also $C^2$ continuous.

Cross fades can be used for any trajectory. It is often useful to transition an internal or transformed trajectory. This causes a smooth transition from one complex motion to a different complex motion in an often unintuitive but powerful way.

As an example, consider a tail wag that involves a sinusoidal motion. When the animatronic figure is happy the tail might want to wave more quickly than when sad. In this example, the frequency of the wag motion would smoothly transition from some lower value to some higher value. In actuality, a fixed sinusoidal pattern can appear too perfect, too mechanical to be life-like. A more life-like solution is to smoothly transition from a low-frequency, slowly-varying, pseudo-random pattern to a high-frequency, slowly-varying, pseudo-random pattern.

Some trajectories, most notably keyframe trajectories, are able to start from an arbitrary initial position or motion. All trajectory objects are initialized during execution before being evaluated for the first time. This initialization sets a number of parameters such as the start time and the start PVA. Keyframe trajectories, if they have been specified to do so, can use this start PVA as their initial keyframe, a subsequent keyframe in the curve, or as a computational component used by that trajectory object. Thus, trajectories that start with a non-predetermined motion can still compute and follow a smooth trajectory.

While the eventual task of a control system is to move the robot's motors, it is often easier to describe motions in a transformation space. For a walking animatronic figure the conceptually simple task of moving the body horizontally, vertically, or rotationally typically requires moving all of the motors in all of the legs in a coordinated fashion. Producing combinations of these conceptually simple body motions quickly becomes impractically difficult if each joint's trajectories has to be described directly. Instead, it is convenient to be able to describe motions in a more intuitive transformation space. In the walking example, motions would be described in terms of the body and the system would compute the motions of the leg motors needed to create that motion. The transformation in this example is between body motion and leg motor motions.

By combining transformations with composite trajectories and PVAs, additional capabilities were realized in this preferred embodiment. A particularly powerful capability was the ability to project motion from one transform space into another. As an example, consider an animatronic figure which picks up a trumpet and plays it, all the while moving its head and body. The position of the animatronic figure's hands while picking up the trumpet would most easily be described in terms of the stationary coordinate system of the table.

Playing the trumpet while the animatronic figure moved would most easily be done in terms of the figure's lips. Transitioning smoothly from one transform space to the other, as well as allowing motions described in one space to be modified or combined in another, is achieved by projecting a motion described in one transform spaced down into joint motions and then projecting those joint motions backwards into the other transform space where it can be modified or combined with other motion components.

Another example is the movement of an animatronic dinosaur, which involves feet positions during walking. While a foot is on the ground, its position is described in terms of ground coordinates, in particular, a foot on the ground should not move or slide along the ground. While a foot is swinging forward in the air during a step, it is described in terms of the body's position. By allowing smooth transitions between these two descriptions or transform spaces it was possible in the scripting language to ask a foot to be lifted smoothly off the ground, swung forward to a prescribed stride position, and set smoothly back onto the ground without having to worry about the component motions that were necessary to make the foot leave and touch the ground smoothly.

The ability to describe and rapidly try out trajectories provides much of the power and flexibility. The scripting language allows trajectory objects to be described at a high level and then have the computer manage them. The computer is also able to perform some optimizations on the scripts as they are read in, or parsed. These optimizations result in smaller trajectory objects that evaluate more efficiently.

The scripting language used in the preferred embodiment is a text-based language that allows trajectories to be defined and manipulated. As a way of explanation, scripts for the trajectories illustrated previously will be shown. The syntax is reminiscent of the computer language C++.

FIG. 17 is an example script for the simple four point keyframe trajectory shown in FIG. 15 used to describe smooth keyframes. In this case, the trajectory is just a list of the keyframe positions interspersed with the time between pairs of keyframes. The text to the right of the // are comments ignored by the computer. The resulting trajectory will run for three seconds.

FIG. 18 illustrates an example script for the composite trajectory shown in FIG. 12. A value "joystick" and a trajectory "envelope" are first defined that are then used as components in the final composite trajectory. Further, the second keyframe in the trajectory envelope contains both a position and a velocity term.

The animatronic system 100 is intended to cover any system that deals with an unconstrained environment where the operator 101 can come in and either modify or completely replace some or all of the behavior and then potentially hand control back possibly even at a new point. The animatronic system 100 provides the ability to mix and to switch between canned (pre-recorded), computed (typically sensor responses, but also planned), and live (operator controlled) motion to produce a seamless amalgam. Accordingly, the animatronic system 100 can be applied to a variety of different configurations. For instance, the animatronic figure 108 can be a surgical robot where a doctor supervises and takes over if the surgical robot overlooks something or otherwise goes astray. If the doctor takes control, the resulting motion appears fluid. If the doctor's intervention was not coordinated with the surgical robot's control of the movements, then a resulting motion may be produced in the transition that may be harmful to the patient.

In addition, the animatronic figure 108 can be a transportation vehicle, such as an automobile, airplane, space shuttle, or train. An automatic pilot feature in the transportation vehicle can allow an operator to override the automatic pilot with a fluid transition motion that ensures the safety of the vehicle and its passengers. The animatronic system 100 can also handle neglected inputs or mistakes.

Further, the animatronic figure 108 can also be a household robot where an owner can redirect the household's robot to different tasks. For example, the owner can redirect the robot to greet guests as opposed to performing a chore. Once again, the transition motion can appear to be life-like.

The animatronic figure 108 can also be a hazardous waste cleanup robot used to clean chemical, nuclear, or biological waste, spills or weapons fallout. For example, the user may direct the hazardous waste robot as to which element of waste material is to be placed in a sealed container, but allow the robot to finish the task on its own. The transition of movement between user and robot control is sufficiently smooth to prevent the robot from dropping or otherwise mishandling dangerous waste materials.

The animatronic figure 108 can be also be a bomb disposal robot. For example, the user may wish to directly control/guide particular movements of the robot while performing a particularly sensitive defusal operation, but allow the robot to finish disposing of the bomb without user guidance. Again, the transition of movement between user and robot control is smooth to prevent accidental and/or unintentional motions that might disrupt sensitive and possibly dangerous tasks.

While the above description contains many specifics, these should not be construed as limitations on the scope of the invention, but rather as an exemplification of preferred embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. An animatronic system comprising:
   a reception module that receives a fixed show selection input and a puppetted input from an operator, wherein the fixed show selection input is associated with at least one fixed show instruction, wherein the puppetted input provides a puppetted instruction;
   an animatronic figure;
   a translation software module that translates the at least one fixed show instruction associated with the fixed show selection input into at least one fixed show physical movement instruction and translates the received puppetted instruction into at least one puppetted physical movement instruction; and
   a motion software module that receives the at least one fixed show physical movement instruction, receives the at least one puppetted physical movement instruction, and calculates a composite animated instruction from the at least one fixed show physical movement instruction and the at least one puppetted physical movement instruction, wherein at least one actuator animates at least one component of the animatronic figure based on the composite animated instruction.

2. The animatronic system of claim 1, further comprising an audio software module that provides an instruction to an audio device to output an audio signal when the motion of the at least one component of the animatronic figure is effectuated.

3. The animatronic system of claim 1, further comprising an automatic fixed show software module that automatically provides the fixed show selection input to the reception module at a predetermined time.

4. The animatronic system of claim 3, wherein the predetermined time coincides with a time that the operator provides the puppetted input.

5. The animatronic system of claim 1, further comprising a button that the operator presses to provide the fixed show selection input.

6. The animatronic system of claim 1, further comprising a sensor operably connected to the animatronic figure that determines the occurrence of an event.

7. The animatronic system of claim 6, wherein the occurrence of the event triggers the fixed show selection input to be inputted to the reception module.

8. The animatronic system of claim 1, further comprising a dial that the operator turns to provide the fixed show selection input to the reception module.

9. A method that produces motion of an animatronic figure, the method comprising:
providing a puppetting instruction to the animatronic figure to perform a puppetting movement;
providing a fixed show selection associated with at least one fixed show instruction to the animatronic figure to perform a fixed show movement;
combining the puppetting instruction with the at least one fixed show instruction to form a combined instruction; and
instructing the animatronic figure to perform the combined instruction.

10. The method of claim 9, wherein the fixed show selection is provided by the user.

11. The method of claim 9, wherein the instructing the animatronic figure to perform the combined instruction results in a composite movement of the puppetted movement and the fixed show movement.

12. The method of claim 11, wherein the puppetted movement is to be performed by the same component of the animatronic figure as the fixed show movement.

13. The method of claim 11, wherein the puppetted movement is to be performed by a different component of the animatronic figure than the fixed show movement.

14. An animatronic figure comprising:
a leg;
a leg actuator that is operably connected to the leg, wherein the leg actuator effectuates movement of the leg;
a wheel;
a wheel actuator that is operably connected to the wheel, wherein the wheel actuator effectuates movement of the wheel;
a processor that determines a leg motion and a wheel motion to effectuate movement of the animatronic figure, wherein the processor sends the leg motion to the leg actuator, wherein the processor sends the wheel motion to the wheel actuator;
a position sensor that determines a first current position of the animatronic figure;
an incremental sensor that measures a second current relative position of the animatronic figure by incrementing the distance traveled from an initial position of the animatronic figure; and
a clipping module that determines if the difference between the second current position of the animatronic figure and the first current position of the animatronic figure has reached a positional clipping limit.

15. The animatronic figure of claim 14, wherein the clipping module determines if the velocity of the animatronic figure in moving from the first current position to the second current position has reached a velocity-clipping limit in addition to reaching the positional clipping limit.

16. The animatronic figure of claim 14, further comprising a clipping module that determines if the acceleration of the animatronic figure in moving from the first current position to the second current position has reached a clipping limit, separately or in conjunction with the position clipping limit and/or with a velocity clipping limit as stated in claim 15.

17. The animatronic figure of claim 14, wherein the clipping module shortens a trajectory of the animatronic figure if the clipping limit has been reached.

18. The animatronic figure of claim 14, wherein the clipping module reduces a velocity of the animatronic figure if the clipping limit has been reached.

19. The animatronic figure of claim 14, wherein the clipping module reduces an acceleration of the animatronic figure if the clipping limit has been reached.

20. A method that produces motion of an animatronic figure, the method comprising:
providing a puppetted instruction to the animatronic figure to perform a puppetted movement;
providing a fixed show selection command to the animatronic figure to perform at least one fixed show movement associated with the fixed show selection;
combining the puppetted movement and the fixed show movement into a composite movement; and
instructing the animatronic figure to perform the composite movement.

21. The method of claim 20, wherein the fixed show selection is provided by the user.

22. The method of claim 20, wherein the combining the puppetted movement and the at least one fixed show movement is a composite of the puppetted movement and the fixed show movement.

23. The method of claim 22, wherein the puppetted movement is on the same component of the animatronic figure as the fixed show movement.

24. The method of claim 23, wherein the puppetted movement is on a different component of the animatronic figure than the fixed show movement.

25. The method of claim 22, further comprising a predetermined limit that reduces the composite of the puppetted movement and the fixed show movement.

26. An animatronic figure comprising:
a leg;
a leg actuator that is operably connected to the leg, wherein the leg actuator effectuates movement of the leg;
a wheel;
a wheel actuator that is operably connected to the wheel, wherein the wheel actuator effectuates movement of the wheel;
a processor that determines a leg motion and a wheel motion to effectuate movement of the animatronic figure, wherein the processor sends the leg motion to the leg actuator, wherein the processor sends the wheel motion to the wheel actuator;
a position sensor that determines a first current position of the animatronic figure;
an incremental sensor that measures a second current relative position of the animatronic figure by incrementing the distance traveled from an initial position of the animatronic figure; and a clipping module determines if the acceleration of the animatronic figure in moving from the first current position to the second current position has reached an acceleration dipping limit.

27. The animatronic figure of claim 26, wherein the clipping module reduces an acceleration of the animatronic figure if the acceleration clipping limit has been reached.

* * * * *